US010585877B1

(12) United States Patent
Casazza et al.

(10) Patent No.: US 10,585,877 B1
(45) Date of Patent: Mar. 10, 2020

(54) SYSTEM AND METHOD FOR ACHIEVING HIGH QUALITY DATA INTEGRITY

(71) Applicants: James Casazza, Lakeville, MN (US); Michael Perkins, Coquitlam (CA)

(72) Inventors: James Casazza, Lakeville, MN (US); Michael Perkins, Coquitlam (CA)

(73) Assignees: James Casazza, Lakeville, MN (US); Michael Perkins (CA)

( * ) Notice: Subject to any disclaimer, the term of this patent is extended or adjusted under 35 U.S.C. 154(b) by 530 days.

(21) Appl. No.: 15/280,552

(22) Filed: Sep. 29, 2016

Related U.S. Application Data

(60) Provisional application No. 62/234,657, filed on Sep. 29, 2015.

(51) Int. Cl.
| | | |
|---|---|---|
| G06F 16/00 | (2019.01) | |
| G06F 16/23 | (2019.01) | |
| G06F 16/24 | (2019.01) | |
| G06F 16/80 | (2019.01) | |

(52) U.S. Cl.
CPC .......... *G06F 16/2365* (2019.01); *G06F 16/24* (2019.01); *G06F 16/80* (2019.01)

(58) Field of Classification Search
CPC ....... G06F 16/2365; G06F 16/80; G06F 16/24
USPC ......................................................... 707/687
See application file for complete search history.

(56) References Cited

U.S. PATENT DOCUMENTS

| | | | | |
|---|---|---|---|---|
| 6,236,994 | B1* | 5/2001 | Swartz | G06Q 10/10 707/635 |
| 8,868,506 | B1* | 10/2014 | Bhargava | G06F 9/466 707/648 |
| 10,120,917 | B2* | 11/2018 | Kothari | G06F 16/219 |
| 10,176,238 | B2* | 1/2019 | Kothari | G06F 16/2365 |
| 2013/0246996 | A1* | 9/2013 | Duggal | G06F 8/35 717/104 |
| 2014/0201139 | A1* | 7/2014 | Blanding | H04L 67/1097 707/621 |
| 2015/0134589 | A1* | 5/2015 | Marrelli | G06F 16/258 707/602 |
| 2016/0092525 | A1* | 3/2016 | Kothari | G06F 16/254 707/602 |
| 2016/0092526 | A1* | 3/2016 | Kothari | G06F 16/254 707/602 |
| 2018/0032997 | A1* | 2/2018 | Gordon | G06Q 20/3224 |

\* cited by examiner

*Primary Examiner* — Hanh B Thai
(74) *Attorney, Agent, or Firm* — Steven M. Koehler; Westman, Champlin & Koehler, P.A.

(57) ABSTRACT

A method including at least storing a plurality of identifiers and metadata associated with a plurality of integration actions. Each of the identifiers are associated with a readable object of a data source. Each of the integration actions are associated with one of the objects. The method including performing, during a first time period, the integration actions including creating objects, updating objects, or removing objects in a data target according to the corresponding objects of the data source. The method including performing, during a second time period, a discovery stage validation on readable objects of the data source and the data target to discover errors or uncertainties. The method also including performing, during a third time period, a re-validation related to the errors or uncertainties discovered in the discovery stage validation. The second and third time periods being independent of the first time period.

21 Claims, 18 Drawing Sheets

| | PROCESS RULES | TRANSFORM | DATA INCLUSION | DATA EXCLUSION |
|---|---|---|---|---|
| PRE - DATA STORE | polling | | | |
| POST - DATA STORE | | | polling | polling |
| PRE - INTEGRATION | | | | |
| POST - INTEGRATION | | | | |
| PRE - VALIDATION STAGE 1 | | | | |
| POST - VALIDATION STAGE 1 | | | | |
| PRE - VALIDATION STAGE 2 | | | | |
| POST - VALIDATION STAGE 3 | | | | |
| PRE - AUTO CORRECT | | | | |
| POST - AUTO CORRECT | | | | |
| PRE - VALIDATION STAGE 3 | | | | |
| POST - VALIDATION STAGE 3 | | | | |
| PRE - REPORT | | | | |
| POST - REPORT | | | | |

Rules can be applied
Rules are not allowed
Rules are conditional

SYSTEM AND METHOD FOR ACHIEVING HIGH QUALITY DATA INTEGRITY

RELATED APPLICATIONS

This application claims the benefit of U.S. Provisional Application No. 62/234,657, filed on Sep. 29, 2015. The entire teachings of the above application are incorporated herein by reference.

FIELD

Described herein are systems and methods related to integrations and validations of data for achieving high quality data integrity.

BACKGROUND

There are many applications that can move data from one system to another. With all of the buzzwords flying around such as "Big Data", and the "Cloud", data is being moved across systems for all industry demographics at a rapid pace. Unfortunately, a significant percentage of this data has low integrity; it is missing, incorrect, or stale. This poses a very interesting question. With all of the data movement between systems across computer networks such as the Internet, how can assurance be obtained that the data moved is actually correct?

Integrations are complex in nature. The technology has evolved to make integrations easier, but there still remain many problems. Many issues are technical and others arise from tradeoffs involved in the movement and storage large amounts of data. For instance, data may be modified or added by users to a target system, and often these changes include data entry errors, which can lead to further problems in not only in the target system but also the source system. Also, unknown processes can impact missing or incorrect data. Furthermore, multiple integrations may conflict with data at the target system. For example, one integration may conflict with another.

As an integration system or application runs successfully over time, the integration system eventually often is ignored as it is assumed to be working correctly. Typically, when integration systems are first implemented each is heavily monitored and fine-tuned. Usually integration systems are monitored through log files or using the integration system's application interface. This usually works up front, but not over time as the integrated target system is used. To monitor over the lift of a target system can be expensive. For instance, monitoring application logs effectively becomes costly as more and more integrations are added to the target. Also, often personnel resources are moved to newer projects leaving little time to maintain older integrations. Sometimes, issues regarding correct operation are not known until a major problem is reported, and significant errors in a target system is often even greater when multiple integration applications are being used. These errors can even become viral in that they corrupt other data in the target system. Also, to compound the issue, often reporting of errors is not all encompassing, for example, inconsistency across multiple records is missed where an error is found in one record. Also, over time single records that are not correct can accumulate and multiply. In many situations, the confidence in data of system can be completely lost.

The aforesaid issues are of much concern to the field of data integrity. Data integrity refers to maintaining and assuring the accuracy and consistency of data over its entire life cycle, and is a critical aspect to the design, implementation, and usage of any computerized system, which stores, processes, or retrieves data. Integration systems commonly have data integrity features built in, but how to measure the data integrity outside of the integrations is often missing. This is problem that needs to be solved efficiently and effectively. Also, most integration systems are stateless and control data within their integration cycle. Such systems can have measures to ensure the data being integrated is correct, but the integrity of the data can be compromised by outside resources or over the lifetime of the system. Described herein are systems and methods that provide improvements to data integrity. The methods and systems described herein are specifically focused on improving data integrity in systems that have multiple integrations over time. One example solution used by the methods and systems described herein to improve data integrity involves the use of stateful integrations oppose to the more common use of stateless integrations. This and other example solutions to enhance data integrity are described in detail herein as well.

SUMMARY

The methods and systems described herein provide solutions for enhancing data integrity in an information system. Specifically, for example, the enhancements can include stateful integrations of data and validations of the integrations independent of the integration process.

For instance, one of the exemplary computer-implemented methods includes: storing a plurality of identifiers in a first data store, each of the plurality of identifiers associated with a respective object, the respective objects being readable objects of a data source; storing metadata associated with a plurality of integration actions in the first data store or in a second data store linked to the first data store, each of the plurality of integration actions being associated with one of the objects; performing, during a first time period, the plurality of integration actions according to an integration request, the performing of the plurality of integration actions including at least one of creating objects, updating objects, and removing objects in a data target according to the corresponding objects of the data source; performing, during a second time period, a discovery stage validation on readable objects of the data source and the data target to discover errors or uncertainties associated with the readable objects of the data source and the data target, the second time period being independent of the first time period; and performing, during a third time period, a re-validation on the readable objects that are associated with errors or uncertainties discovered in the discovery stage validation, the third time period being independent of the first time period. The operations describe in this paragraph are referred to herein as the primary operations of the aforesaid embodiment.

The aforesaid exemplary computer-implement method can include wherein the second time period occurs during the first time period.

The aforesaid exemplary computer-implement method can include wherein the third time period occurs subsequent to the second time period and during the first time period.

The aforesaid exemplary computer-implement method can include wherein each the plurality of integration actions is stateful, and the statefulness of each of the integration actions is maintained by at least one of the stored plurality of identifiers and the stored metadata. Such an embodiment can also include tracking states of at least one of the objects and the integration actions, and the states include whether a respective object or a respective integration action has an error or an uncertainty.

The aforesaid exemplary computer-implement method can include wherein the storage of the plurality of identifiers or the metadata results from triggers in the data source or the data target.

The aforesaid exemplary computer-implement method can further include polling at least one of the data source or the data target, and wherein the storage of at least one of the plurality of identifiers and the metadata results from the polling.

The aforesaid exemplary computer-implement method can include wherein storage of the plurality of identifiers or the metadata results from the discovery stage validation.

The aforesaid exemplary computer-implement method can include wherein the performance of the discovery stage validation during the second time period is periodic and schedulable.

The aforesaid exemplary computer-implement method can further include delaying the storing of the plurality of identifiers and the metadata and the performing of the plurality of integration actions for a selected period of time or until the respective objects are created. Such an embodiment can also include wherein the delaying is configurable and/or automated according to historical frequencies and/or durations of creations of objects.

The aforesaid exemplary computer-implement method can include wherein the discovery stage validation includes: scanning the data target and the data source of the objects for errors or uncertainties associated with the objects; identifying the objects with errors or uncertainties; and if not already stored in the data store, storing at least one of identifiers and corresponding metadata in the data store associated with the identified objects with errors or uncertainties. Such an embodiment can also include wherein the re-validation includes scanning the data target and the data source of the objects to discover errors or uncertainties associated with the objects, and wherein the scanning during the re-validation is specific to data specifically associated with the errors or uncertainties identified during the discovery stage validation. Such an embodiment can also include, when errors or uncertainties associated with the objects are discovered during the re-validation, performing, during a fourth time period subsequent to the third time period, an auto-correction on data with the errors or uncertainties discovered in the re-validation, the fourth time period being independent of the first time period. Even further, such embodiment can include, via the auto-correction, populating the data store with identifiers and corresponding metadata for a subsequent integration. Also, they can include performing, during a fifth time period, a post auto-correction validation on the auto-corrected data subsequent to the fourth time period, the fifth time period being independent of the first time period. They can even further include wherein the storage of the plurality of identifiers or the metadata and the performance of the plurality of integration actions overlaps with at least one of the discovery stage validation, re-validation, the auto-correction, and the post auto-correction validation.

The aforesaid exemplary computer-implement method can further include wherein at least one of the primary operations runs on multiple threads, and wherein the threads are processed simultaneously by a set of data processing devices that operate in parallel.

The aforesaid exemplary computer-implement method can further include wherein at least one of the first data store and the second data store includes a data structure that includes at least one of a database table (such as a lookup table), an associative array, a graph, and an XML document. In an exemplary embodiment, the first data store and/or the second data store includes a queue. The queue includes a list of data items, commands, etc., stored so as to be retrievable in one embodiment in a defined order, usually, but not limited to the order of insertion of the data items, commands, etc.

The aforesaid exemplary computer-implement method can further include wherein: at least one first computer implements the aforesaid storing operations, at least one second computer implements the performance of the integration actions, at least one third computer implements at least one of the performance of the discovery stage validation and the performance of the re-validation, at least one fourth computer implements the data source, at least one fifth computer implements the data target, at least one sixth computer implements at least the first data store, and the first, second, third, fourth, fifth, and sixth computers are each powered separately with separate power sources and communicate with each other over a computer network.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; emphasis instead is being placed upon illustrating the principles of the system. In the drawings, like referenced numerals designate corresponding parts throughout the different views.

FIG. 8 illustrates an exemplary data structure organizing the business rules of an example implementation of the DIS.

DETAILED DESCRIPTION

Figure 1:
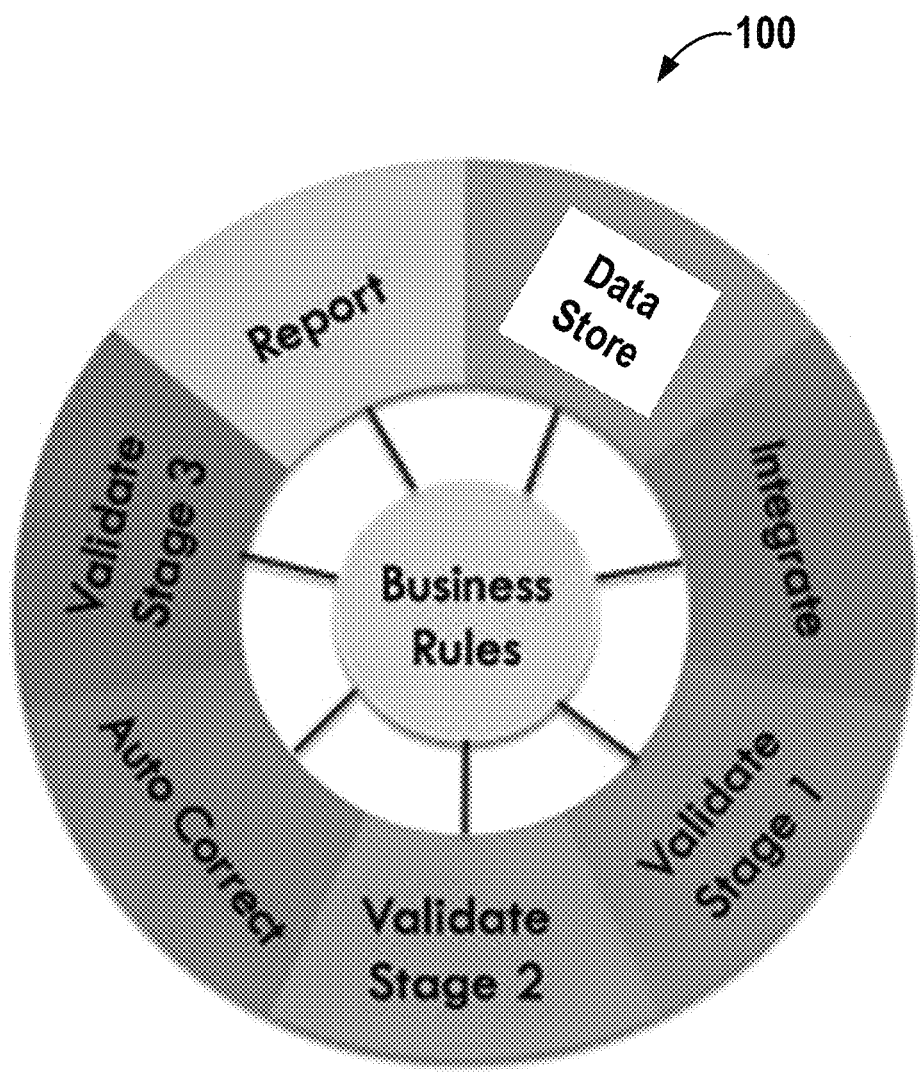
FIG. 1 illustrates a schematic diagram of how business rules generally interact with exemplary operations described herein.

Embodiments of the invention are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

INTRODUCTION

Without limitation some aspects of the system and computer-implemented method herein described provide: an integration process that controls and enhances the ability to ensure the integrations succeed; a process that is governed by the business processes to validate the data across systems in and outside of the integrations scope; and/or a framework that allows the integration process tools to be configurable and extensible and thereby allow the configuration to different applications such as in different technologies or businesses.

Aspects of the system and method herein add the data intelligence to support integrations to improve data integrity across systems. As used herein "data integrity" means data integration and data validation. If desired, aspects of the system and method herein can provide a process that validates data across multiple systems governed by the organization's business rules. Aspects of the system and method herein are implemented through one or more application components that drive and support the process.

Typically, integrations are normally stateless, meaning the data or messages being integrated are not persisted. Once the integration completes execution, results are logged. There are stateful integrations through the use of more complex integration systems. However, maintaining state from the perspective of the integration/validation cycle is not performed.

Aspects of the system and method herein maintains several states, from the time data is ready to integrate to the time the data has been validated and reported. Advantageously, the states can be tracked independently of each other in regards to time. For example, the integrations can run at a 15-minute time interval and the validations can occur once nightly.

Aspects of the system and method can be implemented in a multi-threaded application such as JAVA that requires a database to store the configuration parameters. If used on other systems such as an ORACLE database, aspects of the system and method can be installed in the database and run natively in the database.

FIG. 1 illustrates a schematic diagram 100 of how business rules generally interact with exemplary operations described herein. Generally, the system and method includes one or more of the business rules described herein; a data store component such as a data store component including a data structure, metadata, and/or a queue in exemplary embodiments; an integration component labeled "Integrate" in FIG. 1; one or more validation components labeled "Validate Stage 1", "Validate Stage 2", and "Validate Stage 3"; a data correction component labeled "Auto Correct"; and a reporting component labeled "Report" in FIG. 1. Each is discussed in detail herein. Note examples of these components are at least described with reference to FIG. 4.

Example Business Rules

Embodiments Aspects of the system and method herein use a business rule engine to apply business logic within each stage. Early in the design phase of an integration project, the business analysts and design team define the data to be integrated. They define what should be included, excluded or what data transformations need to occur before sending to the target system. The same applies to validations.

Some business processes may apply to some stages and may not in some other stages. Aspects of the system and method herein support the following business rule processes: TRANSFORM; DATA INCLUSION; DATA EXCLUSION; and PROCESS RULES.

The transform rules are very common in integrations and pertain mostly to the integration stage, but can pertain to a validation stage as well. An example of a transform would be where in the source database the street address is in 3 separate columns in the database, but at the target database the street address is specified as one field. A concatenation transform would need to be applied to concatenate the three street address columns to one. Various forms of transformation functions can be included as desired.

The data inclusion rules apply where there is a need to integrate or validate additional data. An example of data inclusion is when addition cloud services are used as part of the integration. For example, address verification, tax tables, etc. The data may not be in the source system, but the additional data that needs to be in the target exists on an external system.

The data exclusion rules can apply in almost any stage. The exclusion of data is a common trait for data integration. There may be a set of data that one would not want to integrate. A common example of this is date restrictions—when older data should not be integrated. This restriction can be applied at the data store stage or the integration stage.

Optional data may be excluded for validation, where we know that the data is not complete, but is integrated anyway. The validation would exclude these fields.

Process rules allow the business to apply rules on the data to fine tune business processes. This provides greater control on the data being integrated or validated. The process rules are based on a condition—action model. If condition "x" occurs, then execute action "y". The users of the system and method herein define the conditions. The actions are components that can be extended if the standard functions do not solve the business need. Without limitation some standard actions in include:

| COMPONENT | DESCRIPTION |
| --- | --- |
| NOTIFICATION | Notify a set of users, via email or SMS |
| DATA MODIFICATION | Insert, update, delete data in database, or from running integration |
| INTEGRATION TRIGGER | Trigger or start an immediate integration |
| VALIDATION TRIGGER | Trigger or start an immediate validation |
| START EXTERNAL PROCESS | Start a custom application or process |
| STOP EXTERNAL PROCESS | Stop a custom application or process |
| WEBSERVICE CALLOUT | Call an external web service |

Some Exemplary Implementations

Figure 2:
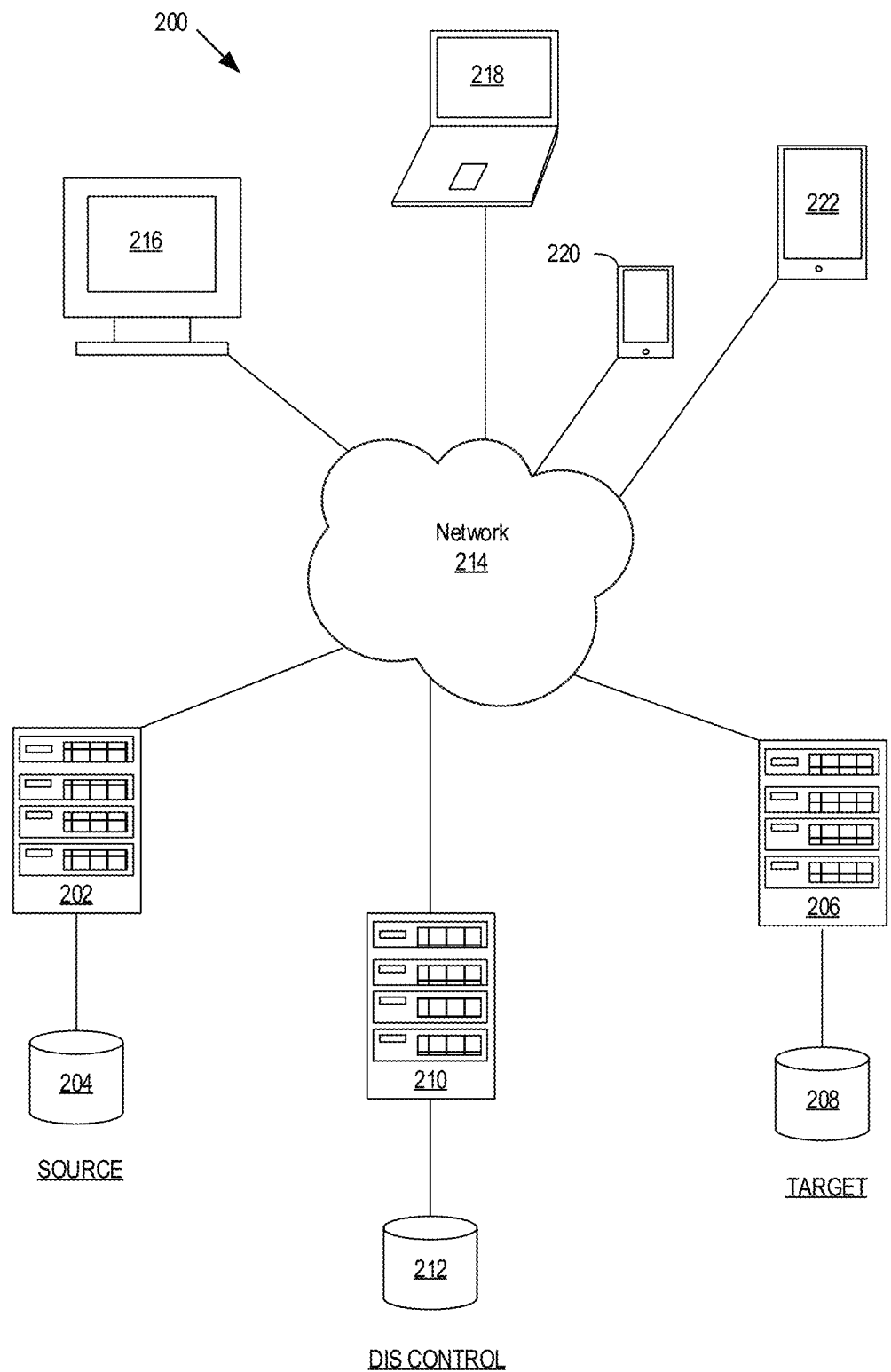
FIG. 2 illustrates a block diagram of an example information system that includes example devices that are part of or configured to use the data integrity system (the DIS).

FIG. 2 illustrates a block diagram of an example information system 200 that includes example devices configured to use the data integrity system (DIS) described herein. The information system 200 in the example of FIG. 2 includes data source server 202, data source database 204, data target server 206, data target database 208, a DIS control server 210, and a DIS control database 212. In some exemplary implementations the data source server 202 hosts the DIS control server 210). The aforementioned servers and databases can be communicatively coupled over a network 214. The network 214 may be a computer network. The aforementioned servers may each be one or more server computers.

The information system 200 may be accessible over the network 214 by user devices, which may include desktop computers (such as device 216), laptop computers (such as device 218), smartphones (such as device 220), and tablet computers (such as device 222). In various examples of such an online information system, users may search for and obtain content from sources over the network 214, such as obtaining content from a search engine server, a content server, or any other type of server providing a service over the network (such as the servers 202, 206, and 210 depicted in FIG. 2). In examples described herein content can include contents of business records such as sales orders.

In an exemplary embodiment, the data source server 202 and/or the DIS control server 210 can control the storing of a plurality of identifiers in the DIS control database 212. In such an example, each of the plurality of identifiers is associated with a respective readable object found either in the data source server 202 or the data source database 204. All communications of data and information occurs through the network 214. The data source server 202 and/or the DIS control server 210 can also control the storing of metadata associated with a plurality of integration actions in the in the DIS control database. Each of the plurality of integration actions are associated with one of the objects found either in the data source server 202 or the data source database 204.

Once the data store is populated with the identifiers and metadata, the DIS control server 210 can perform, during a first time period, the plurality of integration actions according to an integration request (such as a request sent from the data source server 202). The performing of the plurality of integration actions by the DIS control server 210 includes creating objects, updating objects, or removing objects in the data target server 206 and/or data target database 208 such that the data target server and database match the source server and database for the respective objects.

In such an embodiment, the DIS control server 210 can also perform, during a second time period, a discovery stage validation on the readable objects of the data sources and the data targets to discover errors or uncertainties associated with the respective objects. The second time period can occur during the first time period and is independent of the first time period. Also, the DIS control server 210 can perform, during a third time period, a re-validation on only the readable objects that are associated with errors or uncertainties discovered in the discovery stage validation. The third time period occurs subsequent to the second time period, and the third time period is also independent of the first time period.

In such an embodiment, when errors or uncertainties associated with the objects are discovered during the re-validation, the DIS control sever 210 can performing, during a fourth time period subsequent to the third time period, an auto-correction on data with the errors or uncertainties discovered in the re-validation. The fourth time period is also independent of the first time period such that the auto-correction can occur during the plurality of integration actions. Also, the DIS control server 210 can populate the data store with the results of the auto-correction and/or a validation of the auto-correction. This populating of the data store includes adding the objects to be auto-corrected as new identifiers and metadata for new integration actions. These new integration actions can then be performed by the DIS control server 210 upon a subsequent integration request by the DIS control server or one of the other servers of FIG. 2.

The data source server 202 (as well as the data target server 206 and the DIS control server 210) may be implemented using a suitable device. Each of the servers in FIG. 2 may be implemented as a single server, a plurality of servers, or another type of computing device known in the art. Access to the servers can be accomplished through a firewall that protects the applications and information stored and/or used by these servers from external tampering. Additional security may be provided via enhancements to the standard communications protocols, such as Secure HTTP (HTTPS) or the Secure Sockets Layer (SSL). Such security may be applied to any of the servers of FIG. 2, for example. Furthermore, the DIS described herein may be implemented completely on any one or more of the servers depicted in FIG. 2.

The data source server 202 (as well as the data target server 206 and the DIS control server 210) each may provide a configuration front end to simplify accessing and configuring of the applications and information of the DIS by a user. The configuration front end may be a program, application, or software routine that forms a graphical user interface. In an example, the user configuration front end is accessible as a webpage. The webpage can provide fields for configuring various aspects of the DIS, including applications and information of the DIS. These configurable aspects may be changed and viewed when a user is logged on to the system, and may be saved to each server's respective database or another form of data storage and organization.

The servers and databases described herein may be implemented through a computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include a central processing unit and memory. A server may also include a mass storage device, a power supply, wired and wireless network interfaces, input/output interfaces, and/or an operating system, such as WINDOWS SERVER, MAC OS X, UNIX, LINUX, FREEBSD, or the like.

Further, the servers and databases described herein may be implemented as online server systems or may be in communication with online server systems. An online server system may include a device that includes a configuration to provide data via a network to another device including in response to received requests for page views or other forms of content delivery. An online server system may, for example, host a site, such as a business management site, a company site, or a social networking site. An example of a business management site would include a front end application to an enterprise computing system, such as an enterprise system for managing various types of records of a business. An online server system may also host a variety of other sites, including business information sites, educational sites, dictionary sites, encyclopedia sites, wikis, financial sites, government sites, etc.

An online server system may further provide a variety of services that may include web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may or may not be under common ownership or control with the servers and databases described herein.

The network 214 may include a data communication network or a combination of networks. A network may couple devices so that communications may be exchanged, such as between a server and a client device or other types of devices, including between wireless devices coupled via a wireless network, for example. A network may also include mass storage, such as a network attached storage (NAS), a storage area network (SAN), or other forms of computer or machine readable media, for example. A network may include the Internet, local area networks (LANs), wide area networks (WANs), wire-line type connections, wireless type connections, or any combination thereof. Likewise, sub-networks, such as may employ differing architectures or may be compliant or compatible with differing protocols, may interoperate within a larger network, such as the network 214.

Various types of devices may be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels, such as may be known to those skilled in the art. Furthermore, a computing device or other related electronic devices may be remotely coupled to a network, such as via a telephone line or link, for example.

A user device, which may be any one of the devices 216-122 or endpoints described herein, includes a data processing device that may access the information system 200 over the network 214. A user device is operative to interact over the network 214 with any of the servers or databases described herein. The user device may implement a client-side application for rendering front end graphical user interfaces. Through such front ends electronic properties and application data may be viewed and corresponding requests may be received and submitted to any one the service servers depicted in FIG. 2. A user device may communicate data to the information system 200, including data defining electronic properties and interactions with content such as business records. A user device may receive communications from the information system 200, including data associated with services of the servers depicted in FIG. 2. The aforementioned interactions and information may be logged in data logs, and such logs may be analyzed to improve the DIS, as well as secured by one or more encryption and decryption techniques.

A user device may operate as a client device when accessing information on the information system 200. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A client device may vary in terms of capabilities or features. For example, a cell phone may include a numeric keypad or a display of limited functionality, such as a monochrome liquid crystal display (LCD) for displaying text. In another example, a web-enabled client device may include a physical or virtual keyboard, mass storage, an accelerometer, a gyroscope, global positioning system (GPS) or other location-identifying type capability, or a display with a high degree of functionality, such as a touch-sensitive color 2D or 3D display, for example. A client device may include or may execute a variety of operating systems, including a personal computer operating system, such as a WINDOWS, IOS or LINUX, or a mobile operating system, such as iOS, Android, or Windows Mobile, or the like. A client device may include or may execute a variety of possible applications, such as a client software application enabling communication with other devices, such as communicating messages, such as via email, short message service (SMS), or multimedia message service (MMS), including via a network, such as a business management network of an enterprise computing system for managing various types of communications and records of a business. A social network, including, for example, Facebook, LinkedIn, Twitter, Flickr, or Google+, may also be integrated with the business network. At least some of the features, capabilities, and interactions with the DIS described herein may be logged in data logs, and analyzed and used to improve the system, as well as secured by one or more of encryption and decryption techniques.

The disclosed methods and systems may be implemented at least partially in a client-server environment, a cloud-computing environment, a peer-to-peer environment, any other type of distributed application architecture, or any combination thereof.

Figure 3:
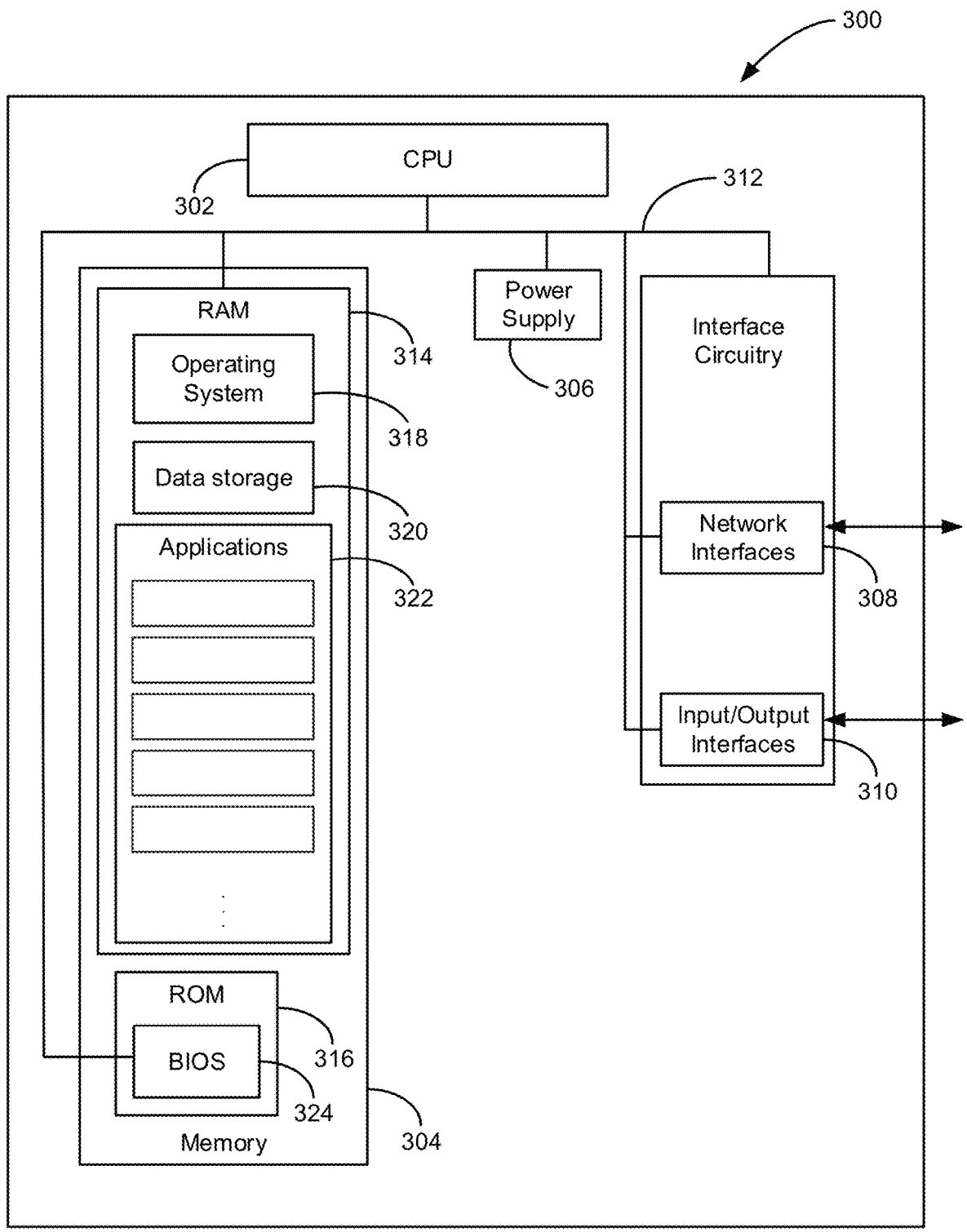
FIG. 3 illustrates a block diagram of an example device that is part of or is configured to use the DIS (such as the DIS illustrated in FIG. 2).

FIG. 3 illustrates a block diagram of an example device 300 configured to use or be an aspect of the DIS described herein such as the DIS control server 210. This illustration of the example device includes a block diagram of an example electronic device. Each of the devices depicted in FIG. 2, may include at least part of the device 300.

The device 300 includes a CPU 302, memory 304, a power supply 306, and input/output components, such as network interfaces 308 and input/output interfaces 310, and a communication bus 312 that connects the aforementioned elements of the electronic device. The network interfaces 308 can include a receiver and a transmitter (or a transceiver), and an antenna for wireless communications. The CPU 302 can be any type of data processing device, such as a central processing unit (CPU). Also, for example, the CPU 302 can include central processing logic. Also, the CPU 302 may include a set of data processing devices that operate in parallel (i.e., parallel computing). For example, the applications running the operations described herein may run on multiple threads and such threads may be processed simultaneously by a set of data processing devices that operate in parallel.

The memory 304, which can include random access memory (RAM) 314 or read-only memory (ROM) 316, can be enabled by memory devices. The RAM 314 can store data and instructions defining an operating system 318, data storage 320, and applications 322. The applications 322 and in some embodiments, part of the operating system 318 and/or data storage 320, can include any set of instructions and/or data structures associated with the features and operations described herein. The operating system 318, data storage 320, and applications 322 may include hardware (such as microprocessors), firmware, software, or any combination thereof. Also, the memory 304 may include a non-transitory medium including instructions corresponding to the applications 322 and/or the operating system 318. These instructions and any instructions described herein may be executable by the CPU 302. The ROM 316 can include basic input/output system (BIOS) 324 of the electronic device.

The power supply 306 contains power components, and facilitates supply and management of power to the device 300. The input/output components of the device 300 can facilitate communications between any components of the electronic device and components of external devices (such as components of other devices of the information system 100, other online server systems, and end user devices). For example, such components can include a network card that is an integration of a receiver, a transmitter, and I/O interfaces, such as input/output interfaces 310. The I/O components, such as I/O interfaces 310, can include user interfaces such as monitors, keyboards, touchscreens, microphones, and speakers. Further, some of the I/O components, such as I/O interfaces 310, and the communication bus 312 can facilitate communication between components of the electronic device, and can ease processing performed by the CPU 302.

The device 300 can send and receive signals, such as via a wired or wireless network, or may be capable of processing or storing signals, such as in memory as physical memory states, and may, therefore, operate as a server or as a client device. The device can include a server computer, dedicated rack-mounted servers, desktop computers, laptop computers, set top boxes, integrated devices combining various features, such as two or more features of the foregoing devices, or the like. Also, the device 300 may include or be one of the endpoints mentioned herein. An endpoint may include a desktop or laptop computer, a mobile device or any type of smart device (e.g., smart phone, tablet computer, smartwatch, smart TV, smart appliance), any type of computer operating a firewall, network equipment such as a router, a point of sale device or system, digital signage, an information exchange or transport system, a control system such as an industrial control system, a data acquisition system, a cloud microservice, a navigation system, and an autonomous car system, just to list a handful.

Figure 4:
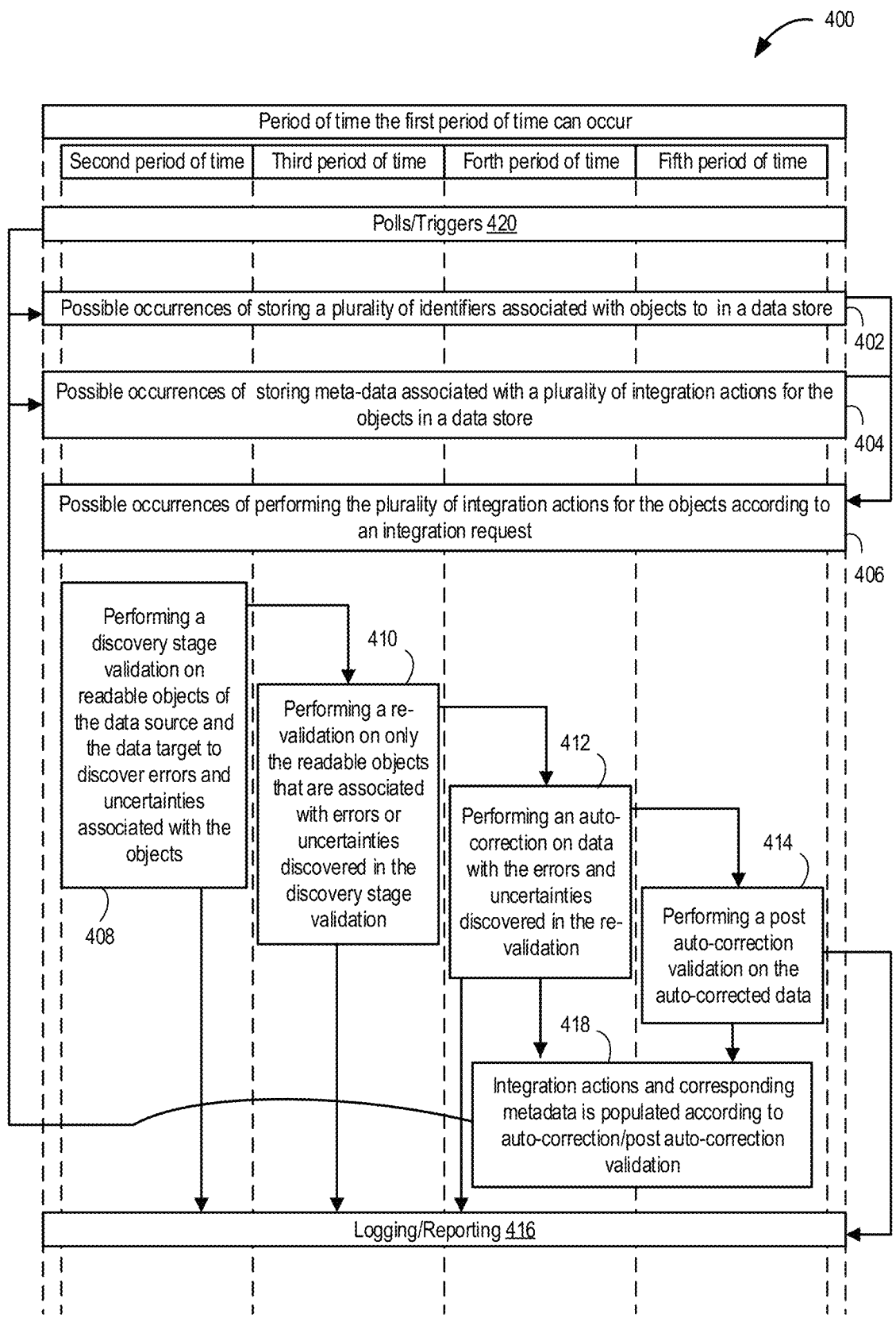
FIGS. 4-6 and 9-18 each illustrates a flow chart of exemplary operations implemented by at least one of the computers, servers, and databases described herein.

FIG. 4 illustrates example operations 400 implemented by one or more of the servers and databases described herein (such as servers and databases 202-212 illustrated in FIG. 2).

The operations 400 include storing a plurality of identifiers in a data store (such as one of the databases 204, 208, and 212 of FIG. 2), at 402. The plurality of identifiers can include a unique identifier, a key, and/or a data address. In an exemplary embodiment, the storing a plurality of identifiers in a data store occurs in the DIS control database 208. For instance, the identifiers are stored in a lookup table of the DIS control database. Also, each of the plurality of identifiers can be associated with a respective object. The respective objects can be at least a part of all readable objects of a data source (such at least part of all readable objects running or stored on data source server 202 and data source database 204). Each of the objects can include a data structure representative of a respective entity.

In some exemplary embodiments, the data store can include a data structure, and in such embodiments the storing of the plurality of identifiers occurs in the data structure. The data structure can include at least one of a database table (such as a lookup table), an associative array, a graph, and an XML document, for example.

Also, in some exemplary embodiments, the data store can include a queue. The queue can include a list of data items, commands, etc., stored so as to be retrievable in one embodiment in a defined order, usually, but not limited to the order of insertion of the data items, commands, etc. In such embodiments with a queue, the storing of the plurality of identifiers occurs in the queue. Also, there can be a separate queue amongst separate data sources. The queue can also be combined with at least one of a database table (such as a lookup table), an associative array, a graph, and an XML document, for example. As used herein a queue is a form of a data structure.

The operations 400 also include storing metadata associated with a plurality of integration actions in a data store (such as one of the databases 204, 208, and 212), at 404. In an exemplary embodiment, the storing metadata associated with a plurality of integration actions in a data store occurs in the DIS control database 208 as well. Also, in some exemplary embodiments, operation 404 can include storing metadata associated with a plurality of integration actions in a data structure or in a linked data structure linked to the data structure. Also, in some exemplary embodiments, operation 404 can include storing metadata associated with a plurality of integration actions in a queue or in a linked data structure linked to the queue. Further, each of the plurality of integration actions can be associated with one of the readable objects of the data source (such as at least part of all readable objects running or stored on data source server 202 and data source database 204).

Each or some of the plurality of integration actions are stateful. The statefulness of an integration action is maintained by at least one of the identifiers and/or corresponding stored metadata. For instance, the storage of the plurality of identifiers and the metadata can allow for tracking states of the objects and/or the integration actions. The states can include whether the respective object or the respective integration action has an error or an uncertainty.

In some exemplary embodiments, the storage of identifiers or the corresponding metadata results from a trigger such as a trigger identifying new business records or an update in information from the data source. A trigger could also result from a found error or uncertainty in the data source or target. Additionally, or alternatively, the storage of identifiers or the corresponding metadata results from polling the data source.

The identifiers and/or the metadata can include an integration name. For example, the identifiers and/or the metadata can include a name of the integration that can identify the data target. Also, the identifiers and/or the metadata can include an origin value name such as the name of the process that inserted or updated the identifier or metadata in the data store. The identifiers and/or the metadata can also include a source reference value such as a reference value used to query the data source to retrieve data associated with the integration action. The identifiers and/or the metadata can also include a source identifier such as an identifier that identifies the data source. The identifiers and/or the metadata can also include an action type such as the action type of the integration action. The action type of an integration action can be a create an object, change an object, or delete an object, for example. The identifiers and/or the metadata can also include request attempts value (i.e., the number of attempts to perform an integration action on a given object) and an update count (i.e., the number of times the given object has been updated via the data store such as updated via a queue). The identifiers and/or the metadata can also include integration action state, which can include the states of listed to be performed, listed to retry action due to action failure, and action completed, for instance. The identifiers and/or the metadata can also include an object state such as incomplete, includes errors or/or uncertainties, or valid, for instance.

Figure 5:
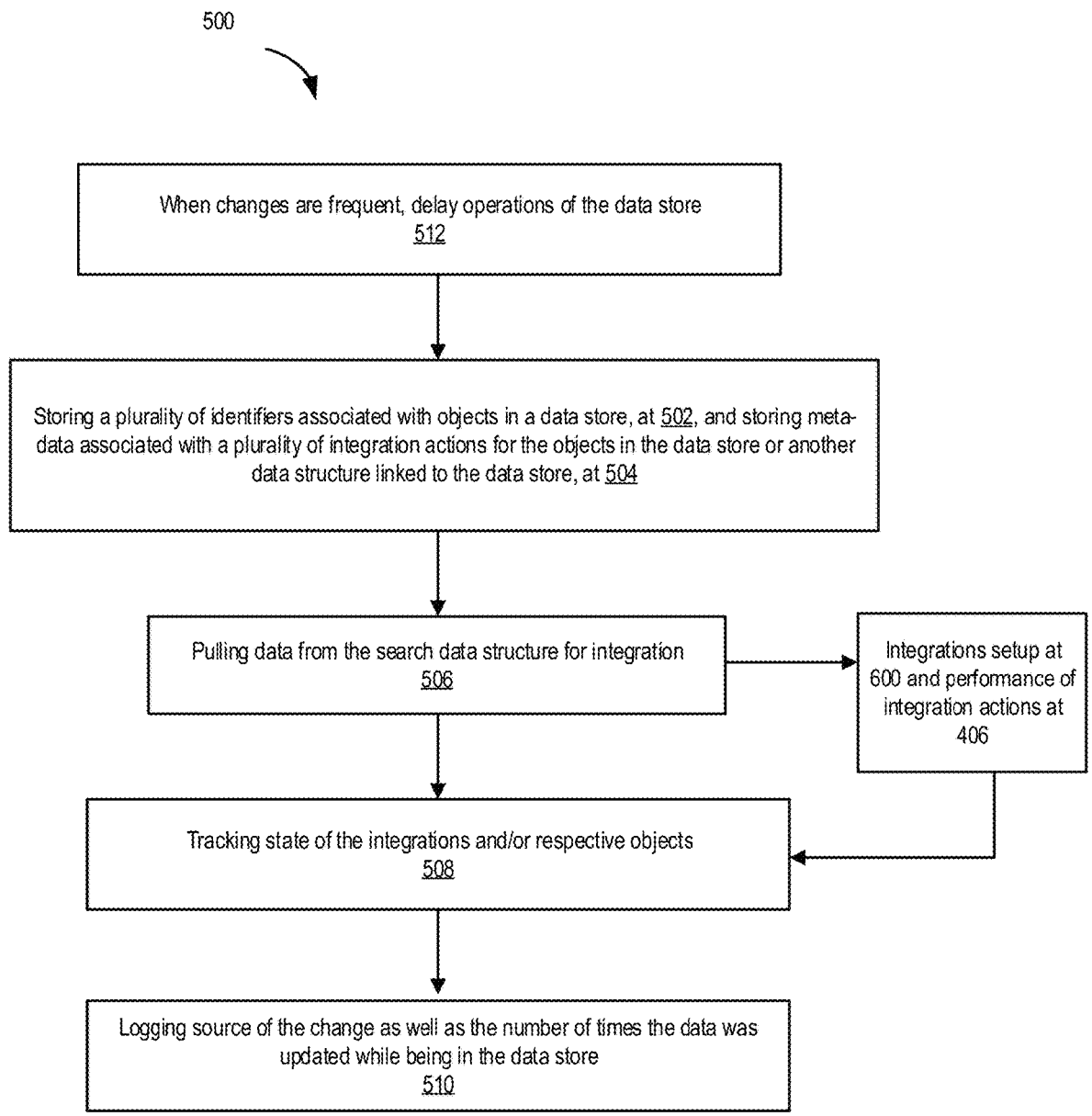

FIG. 5 illustrates example operations 500 implemented by one or more of the servers and databases described herein (such as servers and databases 202-212 illustrated in FIG. 2). FIG. 5 specifically illustrates example operations when the data store includes a data structure. Traditionally, integrations request data from the source system, process and then store the data in the target. In some exemplary embodiments, these steps are similar except that data to be integrated is stored a data structure. For instance, operations 500 include storing a plurality of identifiers associated with objects in a data structure, at 502, and storing metadata associated with a plurality of integration actions for the objects in the data structure or another data structure linked to the data structure, at 504. This allows the state of the integrations and/or respective objects to be tracked at 508, and allows any errors that may occur to be corrected.

When storing the data, a reference value is stored in the data structure. Since there is a time difference between when the data was put on the data structure, at 502 and 504, and the time the data is pulled from the data structure for at integration at 506 (such as an integration including operations 600 of FIG. 6), the data is retrieved using the reference value from the source database so the most up-to-date data is integrated.

The data structure can include information that tracks the behavior of the integration request for a corresponding integration (such as an integration including operations 600 of FIG. 6), such as from the tracking at operation 508. The source of the change can also be logged as well as the number of times the data was updated while being in the data structure, at 510. This advantageously shows how often the data is changing in the source system. In an example embodiment wherein the data structure includes a database table, the table can contain the following columns:

| COLUMN NAME | DESCRIPTION |
| --- | --- |
| INTEGRATION_NAME | The name of the integration identifying where the data is to be sent |
| REFERENCE_VALUE | The field value that is used to query the source database to retrieve the data to be integrated |
| DATABASE_ID | The database identifier that represents the source database where the data will be retrieved |
| ACTION | The action to perform on the target system. Update, Delete, etc. |
| REQ_ATTEMPTS | The number of attempts that have occurred |
| STATE | The state of the integration, The initial state is STORED |
| ORIGIN | The name of process that inserted or updated the record in the data store table |
| UPDATE_COUNT | The number of times the record has been updated in the data store table |

The data structure is used by a data store structure manager (DSSM) component that can be part of the DIS control server 210 and/or the DIS control database, which manages queues, data structures and integrations. It should be noted in other embodiments, there can be multiple queues, data structures, and DSSMs. The data structure can also reside with the source data system such as in the source server 202 and/or database 204. The DSSM can have multiple instances defined to run several integrations.

The operations of the DSSM are configurable for each defined integration. The properties are defined as follows:

| COLUMN NAME | DESCRIPTION |
| --- | --- |
| INTEGRATION_ID | The id of the integration the property is defined for |
| STORE_STATE | The state of the integration the property pertains to: usually STORED and RETRY |
| STORE_DELAY | The delay in minutes when records can be pulled off the data store. For example, do not pull off any records until they have been on the data store for at least 20 minutes |
| REQUEST_SIZE | The maximum size representing the number of records that will be processed with the request |
| THREAD_COUNT | The maximum number of threads that will be spawned. More threads will increase throughput |
| RETRY_COUNT | The maximum attempts a record will be attempted before being removed from the data store |

A delay for the data structure can be advantageously used with data that changes frequently (such as exceeding a threshold), at 512. By way of example, assume the users of a database system are entering orders. There is a trigger, such as a database trigger, that catches the event and places the order on the data structure. But, during the entry, there may be updates to the order, for example, entering order lines. Rather than repeatedly putting the order on the data structure, a delay can be added to give the user time to complete the data entry of the complete order. After the delay expires, the order will be integrated.

Referring back to FIG. 4, the operations 400 also include performing, during a first time period, the plurality of integration actions according to an integration request, at 406. In the operation 406, the performing of the plurality of integration actions can include creating objects, updating objects, and/or removing objects in a data target (such as data target server 206 and/or data target database 208).

Also, the performance of the plurality of integration actions can result from a trigger or polling the data source. For example, the performance of the plurality of integration actions can result from a trigger identifying new business records or an update in information from the data source, as well as a trigger could also result from a found error or uncertainty in the data source or target. Additionally, or alternatively, the performance of the plurality of integration actions can result from the results of polling the data source. In some exemplary embodiments, polling data to determine the storing of the plurality of identifiers and/or the metadata or to determine selection and the performance of the plurality of integration actions is enhanced by sorting and grouping the polled data.

Each of the plurality of integration actions can include a request for selected data associated with its respective object from the data source. Also, the plurality of integration actions can include storage of the selected data in the data target, accordingly. The integration actions and sources of integration actions can also be logged such that the amount of integration actions associated with a given object can be tracked while a respective identifier is stored in the data store such as stored in the data structure.

The operations of the plurality of integration actions can be configurable through configuration attributes. The configurable attributes can include a definition of an integration name. For instance, the attributes can include the rules for creating an integration name and how it is read by the DIS. The configurable attributes can also include a state of an integration action such as initialized, pending, running, or completed. The configurable attributes can also include a timeframe to delay removing an identifier of an object from the data store. For example, the timeframe to delay removing an identifier of an object from the data store can be subsequent to successfully completing an integration action associated with the object or reaching a maximum number of retries of an integration action associated with the object, or even merely a selected duration of time. The configurable attributes can also include a request size such as the maximum number of integration actions in an integration request permitted or the maximum number of objects to act on in an integration request.

The configurable attributes can also include a thread count such as the number of threads permitted to perform an integration request. In an exemplary embodiment, the CPU running an integration request can include multiple and separate data processors, and a plurality of threads performing the integration according to the integration request can run amongst the processors simultaneously in parallel.

The configurable attributes can also include a retry count such as the number of retries permitted for a single integration action or the number of retries permitted for one or more integration actions associate with a single object in an integration request.

Figure 6:
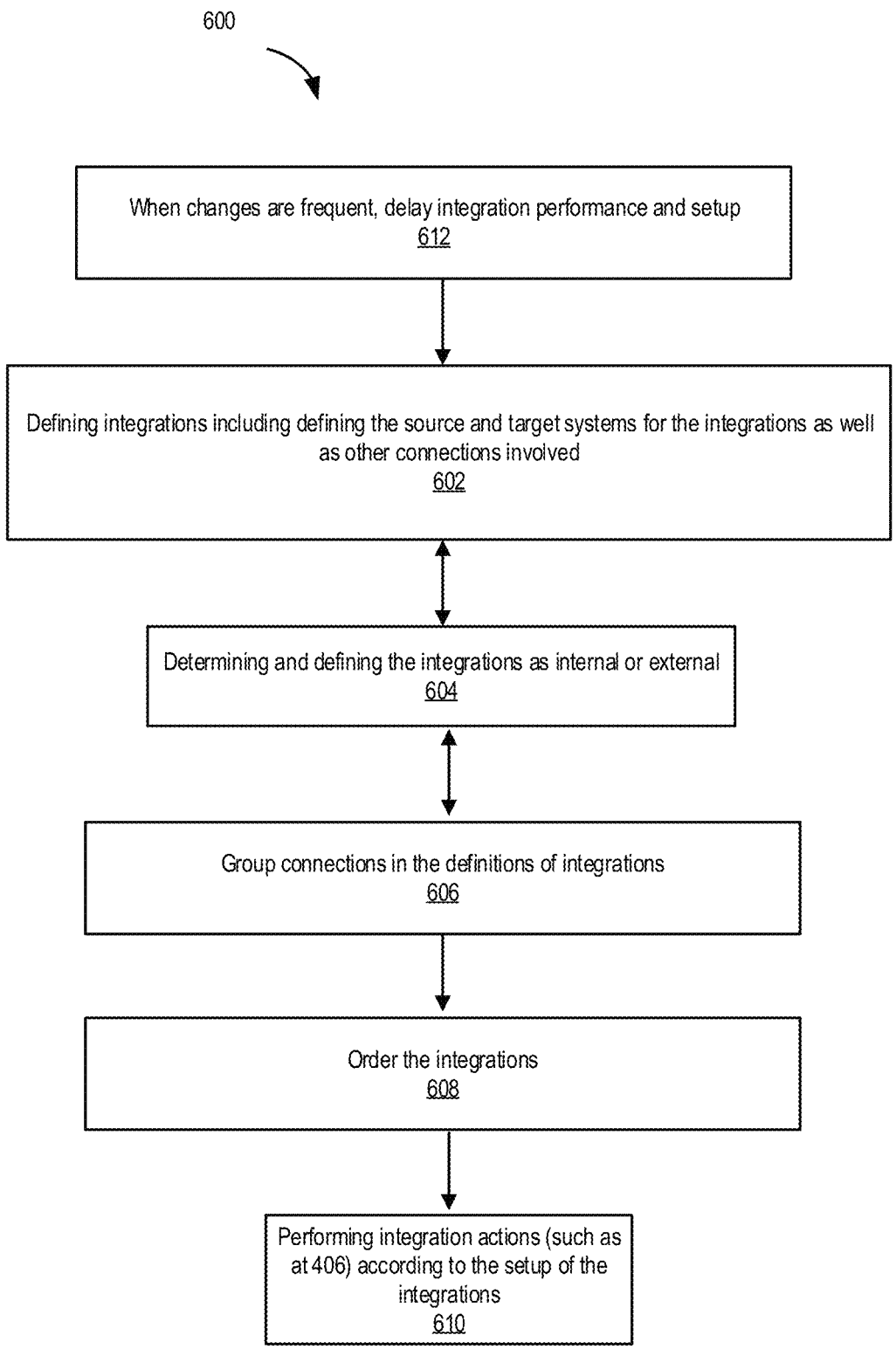

FIG. 6 illustrates example operations 600 implemented by one or more of the servers and databases described herein (such as servers and databases 202-212 illustrated in FIG. 2). FIG. 6 specifically illustrates example operations of integration setup and when the data store includes a data structure. Subsequent to the setup of a set of integrations, the set can be performed as integration actions (such as at operation 406 of FIG. 4). Operations 600 include an integration controller, such as one on the DIS control server 210, defining an integration that includes defining the source and target systems for integrations, at 602. The integrations do not need to run within their own integration stage in exemplary embodiments. This is a characteristic emphasized in FIG. 4. This allows for independence between integrations and validations of the data. Most other known integrations systems cannot validate what they do not integrate. Usually, integration systems execute differently from each other. Many include ETL (i.e., extract, transform, load) typed integrations. Some have business rules and execution languages such as Business Process Execution Language (BPEL). And then there are Business Process Monitoring (BPM) systems. Each has their strengths. Exemplary embodiments of the systems and methods utilize those strengths and can provide support for two types of integrations: internal and external. At 604, it is determined and defined that the integrations are either internal or external.

In some exemplary embodiments, the configuration for integrations can be defined to describe the connections and data for the validators. Defining an external integration signals the DSSM to skip the integration process. This allows the integration to be customizable. The configuration describes the integration's data model, connection information, business rules, and constraints.

The internal integrations can be executed using point-to-point connections between the source and target systems. Some exemplary embodiments can act as a middleware component. Also, embodiments can handoff to other middleware systems such as an enterprise service bus (ESB) and Business process management (BPM). In addition, aspects of the system and method described herein can handoff to messaging systems. A secure messaging system can be used wherein the data source is outside a firewall of the DIS. This can provide added security.

A system hosting the DIS can include connection adapters for several features described herein. The connection adaptors can manage the data stores for the messaging systems. The connection manager defines the source and target connections for integrations. The connection manager manages both database connections and well as web service connections. The connections are defined using the following properties:

| COLUMN NAME | DESCRIPTION |
| --- | --- |
| SERVER | The server connection: JDBC or HTTP URL, hostname, etc. |
| USERID | The userid for the connection. |
| PASSWORD | The password for the connection |
| MIN_CONNECTIONS | The minimum number of connections in the connection pool |
| MAX_CONNECTIONS | The minimum number of connections in the connection pool |

The connections are assigned to integrations. The userid and passwords are typically encrypted, for example, using Advanced Encryption Standard (AES) encryption when stored in a database. A utility application is used to encrypt and decrypt the userid and passwords. The connections are pooled and can be configured as to the minimum and maximum connections to be open for use. This can be done at operation 602.

The connections for the integrations can be grouped for databases and services with the same schemas, at 606. This synchronizes integrations under one configuration rather than configuring a connection for each integration. For cases where there are multiple databases locally or across the country or internationally, the grouping of connections allows the DSSM to read from each data store table through one integration configuration. The advantage of grouping connections allows the integration to run simultaneously ensuring that databases are integrated at the same time.

The present system and method can also support entity chaining which also helps the synchronization of related data. For example, in a typical sales order, there are many related entities in the source that are dependent on each other. The integrations need to be synchronized in order to provide a complete sales order in the target. If the integration to create a sales order fails with any one of the sub-entities, the sales order object at the target will be incomplete. This can be done at operation 602. By chaining, the order can be integrated as one or individually. This allows the entire order data to be sent for creation on the target system, but can also be sent individually for updates and deletes. This feature depends on the target system, to provide the capability of accepting the complete order or individual entities. In some examples, a web service can be developed to handle the sales order, for example. Also, some examples support the ordering of entity chaining so the integrations are executed to handle dependencies. The order of integration execution can be configured at 608, which allows integrations to be executed in a defined order eliminating dependency conflicts.

Another feature of the integration stage in some embodiments is a post process. After the integration completes, a post process can be triggered. This can be used to further process data on the target system or callout to another integration or process.

Finally, at 610, after the integrations setup operations of 602-608, the integration actions can be performed (such as at 406 of FIG. 4). Also, delaying of setting up and performing integrations can be advantageously used with data that changes frequently (such as exceeding a threshold), at 612.

Referring back to FIG. 4, the operations 400 also include performing, during a second time period, a discovery stage validation on readable objects of the data source and the data target to discover errors or uncertainties associated with the objects, at 408. The second time period occurs independent of the first time period. For instance, in embodiments, the second time period can occur during the first time period. Consequently, the second time period can occur before, during, and/or after the first time period. In some exemplary embodiments, the performance of the discovery stage validation during the second time period is periodic and schedulable.

In some exemplary embodiments, the discovery stage validation can include scanning the data target and the data source of the objects for errors or uncertainties associated with the objects. In such embodiments, the discovery stage validation can also include identifying the objects with errors or uncertainties. Also, if not already stored in the data store, such as in the data structure, the discovery stage validation can also include storing identifiers in the data store associated with the identified objects with errors or uncertainties. Also, in these embodiments, the discovery stage validation includes, if not already stored, storing metadata associated with integration actions associated with the identified objects with errors or uncertainties in the data store or in a linked data store linked to the data store. Also, the scanning during the discovery stage validation can cover readable data associated with the objects on the data source and the data target. Further, the scanning can include sorting and grouping the data to reduce the amount of time needed for the performance of the discovery stage validation.

Exemplary embodiments can provide three stages of validation: discovery, revalidate, and final. In the discovery stage, the validators scan and evaluate the data between both the source and target systems. The validators are controlled by the Post Validation Manager (PVM) application.

In the discovery stage, the validators scan to find missing records that are in the source but not in the target system. This identifies missing records that should have been integrated. In addition, the validators scan to find missing records that are in the target system but not in the source. If the integration is bi-directional, then the records in the target need to be updated in the source. However, for uni-directional, source to target, there are records in the target that should be removed. This behavior is configurable when setting up a validator.

Missing records are only a subset of the problems that can occur with integrations. Mismatches of data between each of the fields being integrated are another problematic area. Mismatches can occur due to multiple reasons.

Unauthorized updates in the target system that have not been integrated back to the source system.

Character encoding issues between the characters in the source and target. This happens quite frequently with special characters or whitespace characters.

Data changes in the source that are not to be updated in the target. These should be excluded from validations. Typical with address changes.

Data mapping issues with field values, for example, Status 'C' in a field in the source database, but having the value 'Closed' in target database field. Also, over time new status values can be added in source but not in target. This would cause a mismatch error.

The foregoing are just a few exemplary mismatch scenarios that could happen. Over time as the business changes, more and more of these types of mismatch errors can occur. Without validating the data between source and target, these types of error get unnoticed, and this could affect the reporting that is done with the data. The same applies to missing data. In time, without proper validation, a good number of missing records will occur, but there will typically be a delay before someone will notice. However, if one missing or mismatched record is found, it is typical that many others exist.

The validators gather the data through the use of collectors. The collectors define how the data will be retrieved from the source and target systems. The data is collected in chunks to keep within the system's CPU and memory resources. The configuration for the collectors utilize the connection managers defined for the integrations. The validators are associated with the integrations so there is no need to configure connections for multiple operations. Even though integrations can be external to the system and method herein, the connection information will still be provided.

The collectors support various modes of data retrieval algorithms: date-time, count, all, revalidate, and many more. When configuring a validator, there are properties associated will the collectors, which can include:

| COLUMN NAME | DESCRIPTION |
| --- | --- |
| COLLECTOR_UNIT | The unit of the collector [MONTHS, NUMBER] |
| COLLECTOR_INTERVAL | The interval (number) to use for the unit |
| COLLECTOR_SOURCE_CONSTRAINT | The constraint on the source DATE > 2015 January |
| COLLECTOR_TARGET_CONSTRAINT | The constraint on the target DATE > 2015 January |
| COLLECTOR_START_INDEX | The start index for the interval |
| COLLECTOR_END_INDEX | The end index for the interval |

For custom validations, custom collectors can be developed and included into the system and method herein. Once the collectors run, the data collected can be validated.

When validating data, there are cases that use special considerations. Sometimes integrating data from the source to the target doesn't result in using the data in the same context. Stated another way, the use of the data changes where it can, for example, be marked as active or logically deleted. An example would be products in the source system integrated to an e-commerce application on the web. Some products may be inactive on the web site to discontinue sales temporarily. In other words, the product is still valid in the source systems, but inactive in the target. The validators herein keep track of records to compare but also identify the active records for reporting. In this case, it's the active records that are of concern, as the records marked inactive are not to be used. When the validators calculate the results for integrations that do not fall into the use of active/inactive records, the metrics of active/inactive records are the same. For example, the overall in source not in target and the active in source not in target counts are equal, or there can be more active in the source.

Validating the missing records includes checking the records in the source set against that contained in the target set, vice versa. The mismatch of data uses comparators that work off of the data types of both the source and the target. All string compares are done at the byte level. The comparators utilize convertors to change the data types of the target to the data type of the source where they differ. The validation process for the discovery stage is just that, to discover: any data records that are missing, and any data between the source and target systems that are not exactly the same.

The validation process is exhaustive and can be time consuming. The validators depend on the amount of data being collected and the number of findings. The more errors detected, the more time it takes to complete. However, the benefit of this exhaustive process is that it identifies problems that would have not been noticed until there was a major problem. In some use cases of the validators, many business type issues were found that were never included in the integration, so right off the bat, the data was never correct while appearing to be correct. An example was the invoice amounts on sales orders were not aligning between the source and target systems. While the products were being integrated, it was later found that the orders also had work orders and services charges tied to the invoices. This was not part of the initial requirements, but was found during the validation process.

Referring back to FIG. 4, the operations 400 also include performing, during a third time period, a re-validation on only the readable objects that are associated with errors or uncertainties discovered in the discovery stage validation, at 410. The third time period occurs independent of the first time period and subsequent to the second time period. For instance, in embodiments, the third time period can occur during the first time period as well. Consequently, the third time period can occur before, during, and/or after the first time period depending also on when the second time period occurred.

In some exemplary embodiments, the re-validation can include scanning the data target and the data source of the objects for errors or uncertainties associated with the objects. The scanning during the re-validation can cover readable data associated with the objects on the data source and the data target. Also, the scanning during the re-validation can be specific to only data specifically associated with the errors or uncertainties associated with the objects on the data source and the data target.

Since the initial validation stage is exhaustive and can be time consuming, there is a great chance integrations are still running while stage 1 validation is being conducted. For example, if the data entry user is entering data at time x, the integration may start at time y. The validator starts at time z, which is sometime between x and y. This will result in records being in the source but not the target, although they are in the process of being integrated.

The second stage of the validation process is the Revalidate stage. The collector for this stage simply retrieves the missing and mismatched record sets that was detected in the discovery stage.

The purpose of the revalidate stage (Validation Stage 2) is that there is no universal method to synchronize snap shots of data between the source and target database. For database integrations, there are some databases that have mechanisms to retrieve a snap shot of databased on a timestamp, but that solution does not apply to all scenarios.

One way to avoid integration conflicts with the validators would be to stop the integrations from running while the validators are running, but that is not a sound alternative as the business may need the data as soon as possible.

When the (second stage) validator runs at this stage, the number of records to validate are much lower than in the discovery stage. In many situations, the number of revalidations should be in the single digits. Upon completion of the revalidation, the report numbers are adjusted to reflect the actual missing or mismatch records.

Referring back to FIG. 4, the operations 400 also include: when errors or uncertainties associated with the objects are discovered during the re-validation, performing, during a fourth time period subsequent to the third time period, an auto-correction on data with the errors or uncertainties discovered in the re-validation, at 412. The fourth time period is also independent of the first time period. Consequently, the auto-correction can occur during the plurality of integration actions. And, the fourth time period can occur before, during, and/or after the first time period depending also on when the third time period occurred. In some exemplary embodiments, as depicted in FIG. 4, the storage of the plurality of identifiers or the metadata and/or the performance of the plurality of integration actions can overlap with at least one of the discovery stage validation, re-validation, and the auto-correction.

In some exemplary embodiments, operations of the auto-correction are configurable through configuration attributes. The configuration attributes can include an option to enable auto-correction. The configuration attributes can also include action types for a data source such as the action types permitted in an auto-correction for a data source. These types can include create an object, change an object, or delete an object, for instance. The configuration attributes can also include action types for a data target such as the action types permitted in an auto-correction for a data target. These types can include a create an object, change an object, or delete an object as well. The configuration attributes can also include a limit for a data source such as the maximum number of auto-corrections permitted on the data source for a certain duration of time. The configuration attributes can also include a limit for a data target such as the maximum number of auto-corrections permitted on the data target for a certain duration of time.

There can be two auto correctors to repair any of the findings remaining after the revalidation stage. The auto correctors are simply to correct the missing records and mismatch records. The correctors can be part of the present system and method framework and therefore can be extended to provide any additional processing if needed to correct the findings from the validators.

The basic premise of the correctors is to re-integrate the data. The auto correctors take the validation results and place those that are missing or mismatched back on the data store to be processed.

All of the data to be integrated or validated is based on unique keys to identify a record. Sometimes the key for integrations differs from the key used in the validators. The auto corrector decides which key to use for the data store. The auto correctors basically store the source discrepancies and the target discrepancies. The auto correctors need to be enabled to actually run. The number of records to be corrected can also be limited.

The auto correct stage can be configurable based on the following properties:

| COLUMN NAME | DESCRIPTION |
| --- | --- |
| AUTO_CORRECT_ENABLE | Enable auto correct for integration |
| AUTO_CORRECT_SOURCE_ACTION | Action to execute for source (I, U, D) |
| AUTO_CORRECT_TARGET_ACTION | Action to execute for source (I, U, D) |
| AUTO_CORRECT_SOURCE_DATA_LIMIT | Limit the number of source records to correct |
| AUTO_CORRECT_TARGET_DATA_LIMIT | Limit the number of target records to correct |

Referring back to FIG. 4, the operations 400 also include: performing, during a fifth time period, a post auto-correction validation on the auto-corrected data subsequent to the fourth time period, at 414. The fifth time period is also independent of the first time period. Consequently, the post auto-correction validation can occur during the plurality of integration actions. And, the fifth time period can occur before, during, and/or after the first time period depending also on when the fourth time period occurred. In some exemplary embodiments, as depicted in FIG. 4, the storage of the plurality of identifiers or the metadata and/or the performance of the plurality of integration actions can overlap with at least one of the discovery stage validation, re-validation, the auto-correction, and the post auto-correction validation.

The last validation can be the final stage. This validation stage does one final validation with the remaining missing and mismatch records and identifies the true errors with the integration.

The work effort in this stage is assuring the statistics are accurate. The corrected records in the source but not in the target records must be removed from the missing logs, and the in the target records but not in the source records that were deleted at the target must be removed from the missing logs. The same applies to the mismatch records—any that were corrected must be removed from the logs in order to capture the correct reporting.

In addition, the validations keep track of the records that were validated. These counts must be adjusted as well. The statistics that are kept for the validations can include:

| COLUMN NAME | DESCRIPTION |
| --- | --- |
| VALIDATION_NAME | The name of the validator that logged results |
| INTEGRATION_NAME | The name of the integration the validator ran against. |
| TOTAL_RECORDS_IN_SOURCE | The total number of records in the source system |
| TOTAL_RECORDS_IN_TARGET | The total number of records in the target system. |
| ACTIVE_RECORDS_IN_SOURCE | The number of active records in the source system. |
| ACTIVE_RECORDS_IN_TARGET | The number of active records in the target system. |
| IN_SOURCE_NOT_IN_TARGET | The number of records in the source system but NOT in the target system. |
| IN_TARGET_NOT_IN_SOURCE | The number of records in the target system but NOT in the source system. |
| ACTIVE_IN_SOURCE_NOT_IN_TARGET | The number of active records in the source system but NOT in the target system. |
| ACTIVE_IN_TARGET_NOT_IN_SOURCE | The number of active records in the target system but NOT in the source system. |
| RECORD_MISMATCH_COUNT | The overall record mismatch count fount by the validator. |
| ACTIVE_RECORD_MISMATCH_COUNT | The overall active record mismatch count fount by the validator. |
| RECORDS_WITH_NO_EXTERNAL_ID | The number of records that did not have an external id set in the target system |

The operations 400 also include logging and reporting results of at least one of the integration actions, the discovery stage validation, the re-validation, the auto-correction, and the post auto-correction validation, at 416. In some exemplary embodiments, separate computers can implement each or various combinations of the operations 400, including even a separate computer for the logging and reporting. Also, the data source, the data target, and the data store (such as a data store including a data structure or a data store including a linked data structure linked to the data structure) can be hosted by respective separate computers. These respective separate computers can be powered separately from each other by separate power sources such that if one fails the data integration and validation may still be able to occur to at least some extent.

The report is commonly the final stage of the process. The report engine provides the analytics and statistics to show the metrics of the integrations and validations. These statistics can be displayed in a graphical dashboard highlighting the previous integrations and validations. From the report, the business owners can retry the integration. When investigating failures, which can be missing or mismatches of data, the report will provide the links to view the data from both the source and target system to compare. All of the error information will be provided to help determine what the probable cause was for the failure. If the cause cannot be determined or the retry of the integration did not fix the problem, the option to escalate the issue can be available. The escalation can be as simple as a notification or integration with a service ticketing system.

There are several real-time reports as well as statistical reports. The real time reports can include:

| REPORT NAME | DESCRIPTION |
|---|---|
| CROSS STORE STATS | This real time report shows the number of records that are in the data store awaiting integration |
| JOB STATUS | The status of all database or scheduled jobs that are configured |
| INTEGRATION STATS | The integrations stats for the current date with total records, success, fail numbers for each integration. |

The statistical reports are:

| REPORT NAME | DESCRIPTION |
|---|---|
| HEALTH | Displays the health status for each integration. The health of the integrations is based on the number of success to failures, the number of retries, and other metrics that can affect an integration |
| THROUGHPUT | Tracks the number of total number of records that can be processed per hour |
| CONFIDENCE | Measure the number of failures over time, which relates to the confidence of the data. Low confidence relates to bad data. |
| AVERAGE PROCESS TIME | The average time a record or batch of records are processed. |
| TOTAL EXECUTED | The total number of records that were integrated |
| TOTAL PROCESS TIME | The total time of execution per integration |
| TOTAL SUCCESS | The total number of records that were successfully integrated |
| TOTAL FAILED | The total number of records that were NOT successfully integrated |
| TOTAL RETRY | The number of times a record was retried |

The daily integration report displays:

| STAT NAME | DESCRIPTION |
|---|---|
| TOTAL RECORDS IN SOURCE | Displays the health status for each integration. The health of the integrations is based on the number of success to failures, the number of retries, and other metrics that can affect an integration |
| TOTAL RECORDS IN TARGET | Tracks the number of total number of records that can be processed per hour |
| ACTIVE RECORDS IN SOURCE NOT TARGET | Measure the number of failures over time, which relates to the confidence of the data. Low confidence relates to bad data. |
| ACTIVE RECORDS IN TARGET NOT SOURCE | The average time a record or batch of records are processed. |
| ACTIVE RECORDS MATCHED | The total number of records that were integrated |
| FAILED RECORD LIST | The total time of execution per integration |

The dashboard will contain the following charts:

| NAME | DESCRIPTION |
|---|---|
| HEALTH METER | Displays the health score as a meter of integrations. Clicking on this chart will expand to a health chart for each integration. |
| CONFIDENCE METER | Displays the confidence score as a meter of integrations. Clicking on this chart will expand to a confidence chart for each integration. |
| SUCCESS FAILURE BAR CHART | Displays the number of successful records in contrast to the failure totaling to the number of records attempted. Clicking on this chart will expand |

-continued

| NAME | DESCRIPTION |
|---|---|
| | to the individual integration chart - the daily integration report |

These statistics and reports will expand to contain historical data as well to show the improvements or degradation over time.

In an exemplary embodiment, integration actions and corresponding metadata is populated in the data store according to the results of the auto-correction and/or the post auto-correction validation, as depicted in FIG. 4 at 418. In alternative embodiments, integration actions and corresponding metadata can be populated in the data store according to the results of the discovery stage validation, the re-validation, the auto-correction, and/or the post auto-correction validation. The integration actions and the metadata can also be populated by separate instances of polling and/or triggers, at 420.

Not shown, the operations 400 further can include delaying at least one of the storing operations, the performance of the integration actions, the polling instances, actions resulting from the triggers, and the discovery stage validation for a selected period of time or until creation of the respective objects under the integration or the validation are initially created. Also not shown, delaying can also occur for the re-validation, the auto-correction, and the post auto-correction validation for a selected period of time, until a performance of the plurality of integration actions is finalized for a given object or set of objects, or until creation of the respective objects under the integration or the validations are initially created. The delaying may be configurable, such as for thirty minutes. In some other embodiments, the delaying is automated according to historical frequencies and/or durations of creations of objects or the performances of integration actions for objects. For instance, a duration of time is predicted for the initial creation or the performance of integration actions for a given object or set of objects according to corresponding historical data. Then, the prediction is used to configure the delay automatically.

An Exemplary Framework

Figure 7:
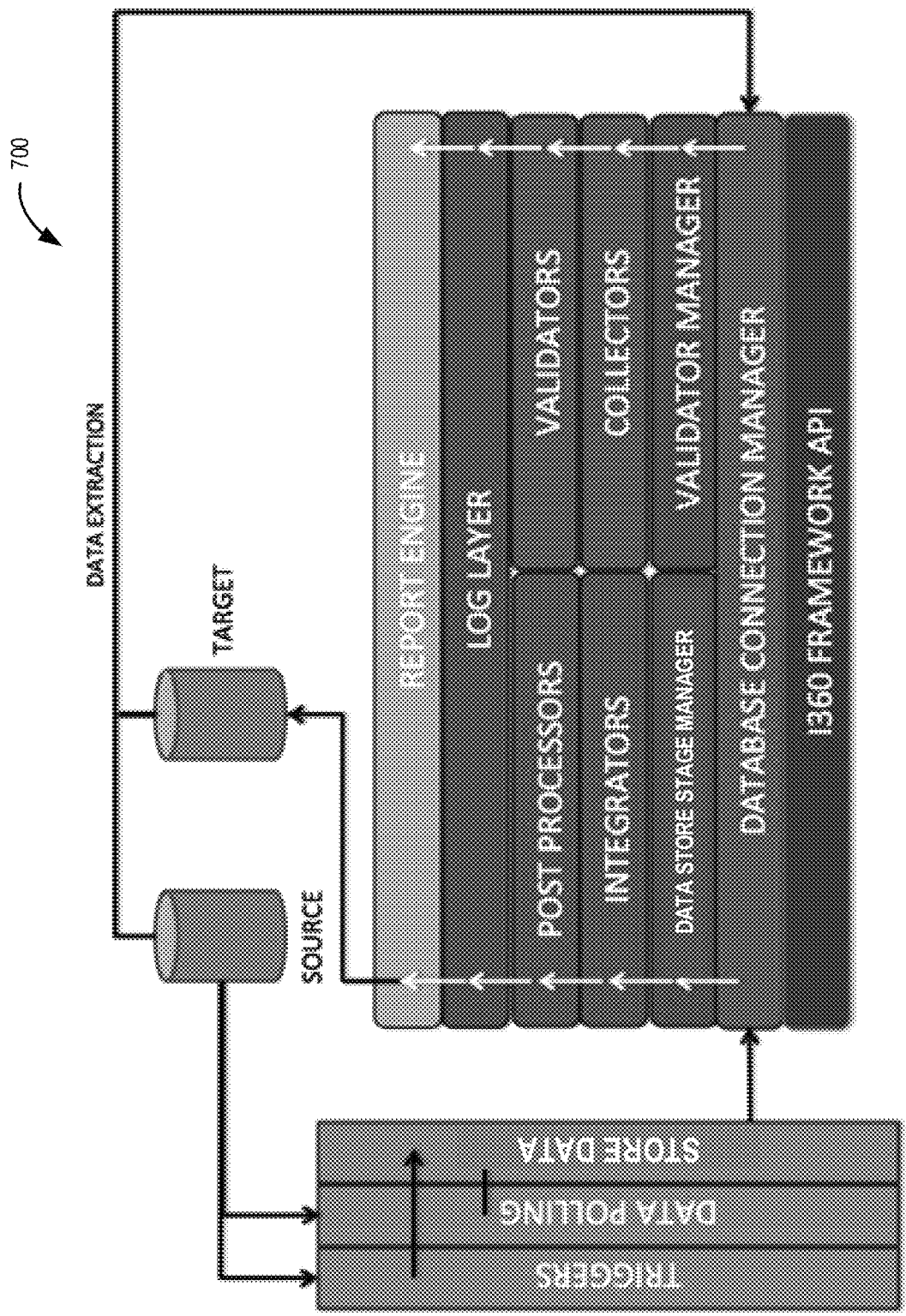
FIG. 7 illustrates a block diagram of an example framework of an exemplary embodiment of the DIS.

FIG. 7 illustrates a block diagram of an example framework 700 of an exemplary embodiment of the DIS. Integrations and validations to be configured through a graphical interface in the system and method herein described. In a preferred embodiment, the core of is the framework API. This allows aspects of the system and method herein to be extended. As new technologies arise, the demand to integrate with those new technologies is high. To wait for a proprietary solution to update their application/middleware to support those new technologies or services can take a while to reach production.

Each component located above the Framework API in the figure above can be extended or replaced. A new DSSM or PVM (Parallel Virtual Machine) can be written as well as extended to suit the needs of the organization's integration needs. With the framework developed in JAVA, there are a large number of JAVA resources that will know how to develop on this platform.

The framework relies heavily on a database. Data from the source systems need to populate the request to the data store. Without limitation this is done either through triggers, a stored procedure, JAVA application, or messaging service (AQ, JMA, MQ, etc.)

Exemplary Logs

The system and method herein provide multiple log tables to capture the activities during execution. The logs that are captured are defined below:

| TABLE NAME | DESCRIPTION |
| --- | --- |
| INTEGRATION_LOG | A log file that contains the trace of the overall integration request. The log of individual data records that were integrated is in INTEGRATION_BATCH_LOG |
| INTEGRATION_BATCH_LOG | A log file containing the individual data record trace that was part of the integration request. If the integration request contains a batch of 200 records, those 200 records would be logged individually in this table |
| PVM_TECH_LOG | A log containing the trace of the Post Validation Manager (PVM) application. This log is detailed and is of use for debugging purposes. |
| DSSM_TECH_LOG | A log containing the trace of the Data Store Stage Manager (DSSM) application. This log is detailed and is of use for debugging purposes. |
| VALIDATION_LOG | A log file containing the Post Validation Manager results |
| VALIDATION_MISMATCH_LOG | A log containing the records found by the PVM that were a mismatch |
| VALIDATION_MISSING_LOG | A log containing the records found by the PVM that were a missing |

The logs can be stored in the database instead of in the file system. Realizing that the file system has some advantages over the database, like rollover and file size limits, the system and method incorporated some of those concepts. Logs can get rather large so there can be a properties table that allows the logs sizes to be specified. The default properties are defined as:

| PROPERTY NAME | VALUE | DESCRIPTION |
| --- | --- | --- |
| DSSM LOG ENABLE | N | should be enabled only for debugging |
| PVM LOG ENABLE | N | should be enabled only for debugging |
| DSSM BACKLOG | 5 | number of logs when enabled |
| PVM BACKLOG | 5 | number of logs when enabled |
| INTEGRATION BACKLOG | 30 | number of days to keep |
| VALIDATOR BACKLOG | 30 | number of days to keep |

Exemplary Performance

The performance is impacted by the data that is being integrated. To help with the performance of large integrations is the ability to control the number of threads, which will run the integrations simultaneously. This is an advanced option, which would require the understanding of how threads work. Setting the number of threads too high can also cause a negative impact on the integrations. Too many threads could increase I/O and or CPU activity, which can put a load on the databases when retrieving the data.

To solve this issue, Smart Performance Monitoring (SPM) can be incorporated into the system and method described herein. The SPM monitors the performance metrics of the database and JVM. Based on the resources being used, the SPM will adjust the number of threads dynamically at run time. When this feature is enabled, the SPM treats the data store thread count property as the maximum number of threads that will be spawned. If performance is constantly at its peak, multiple DSSMs can be configured to divide the amount of processing.

The validators run in a single thread due to its nature to compare the data collected. The difficulty lies in dividing the data consistently into sets between multiple threads ensuring the data from the target set is contained in the source set. The validators are typically run over night when business activity is low. Multiple PVMs can be configured to validate integrations.

Some Exemplary Features and Benefits

Aspects of the system and method herein provides the ability to scale by adding additional DSSM and PVM managers. The managers can use multiple databases as well. This allows multiple integrations and validators to be configured making the number of integration and validation configurations infinite.

Aspects of the system and method herein is installed and can operate from within an organization's firewall and/or a cloud computing system, for example. The data store data tables reside on the source databases. All integrations are initiated from within the firewall to the target system, which may or may not be within the firewall.

Source systems can reside outside the firewall. In this case the data store stage tables should reside with the source. The DSSM will connect from within the firewall to the database where the data store stage table resides. If the source system is not a database, the data store stage table should be created and made accessible through a web service. For example, a proprietary application can be an external system in the cloud. A data store stage object is created in the proprietary application and the DSSM can connect and retrieve the data to integrate from proprietary application to the target system.

In many if not all cases, connections come from within the organizations firewall. In the case where the data store stage table cannot be created, a messaging system can be used. ORACLE AQ, JMS, or IBM MQ are some of the messaging systems that can be used. The external source system will send a message to the messaging service. Aspects of the system and method herein has adapters that will connect to the messaging system to pull the request data and send it to the data store data tables. Again, in this scenario, the connection is initiated from within the organization's firewall.

The combination of the data store, integration, and validation components provide a complete 360-degree view of an integration to ensure data being integrated is accurate.

The validators work to detect changes over time to catch errors caused outside of the integrations, where the integrations themselves would be working fine, but cause errors in reporting. For example: data entries at the target system invalidating the master source data, data entry errors at the source that cause improper mappings at the target; and business process changes or missed processes not caught during integration design.

The integration manager (i.e., the DSSM) and validation manager (i.e., the PVM) can be run independently. This allows for support of other/existing integration tools to be included in the validation.

The system is a framework that can be extended using the common JAVA programming language, therefore running natively on any software platform: LINUX, MACOS, WINDOWS, etc. Can even run natively in the ORACLE database.

An Exemplary Business Rule Application

FIG. 8 illustrates an exemplary data structure 800 organizing the business rules of an example implementation of the DIS. As illustrated in FIG. 8, aspects of the systems and methods described herein can have seven stages: Data Store, Integration, Validation Stage 1, Validation Stage 2, Auto Correct, Validation Stage 3, and Report. When applying business rules, they can be applied before the execution of the stage and after the execution of the stage. Therefore, business rules can be executed fourteen times throughout the integration process.

Business rules can be applied at any stage of the process; however, the application of the business rule may not be applicable. Transformation business rules are only applicable in the Pre-Integration stage and the Pre-Validation stages. From an integration view, there is no need to transform at the other stages. The process rules however are configured by the user and can be customized by extending the framework. This allows the business rules to be applied at any stage regardless of what is supported internally by the system and method described herein.

For the Pre-Store stage, only polling data stores are supported for any business rule including process rules. This reason is that the queuing mechanism is handled by external systems for trigger-based data stores. A trigger-based data store is where the external system detects a change and places the change on the integration data store. Polling data stores are executed from within the system and method. A polling data store reads data from the external system, determines the changes, and puts the data on the data store. Since the execution is within integration, the business rules can be applied.

The Data Inclusion and Data Exclusion business rules cannot be applied after the Integration and Auto Correct stages because there is nothing to include or exclude at that point.

Exemplary Data Store Stage Flows

Figure 9:
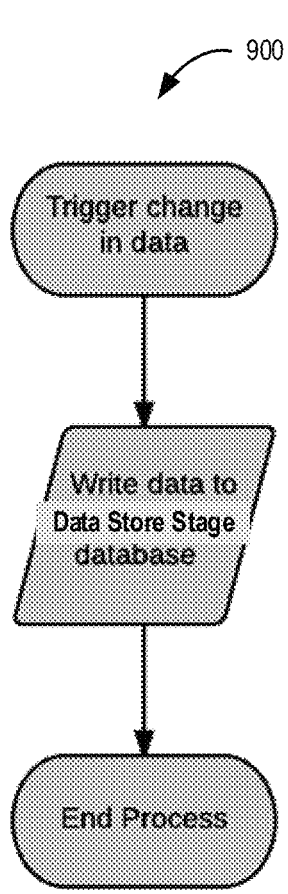
Figure 10:
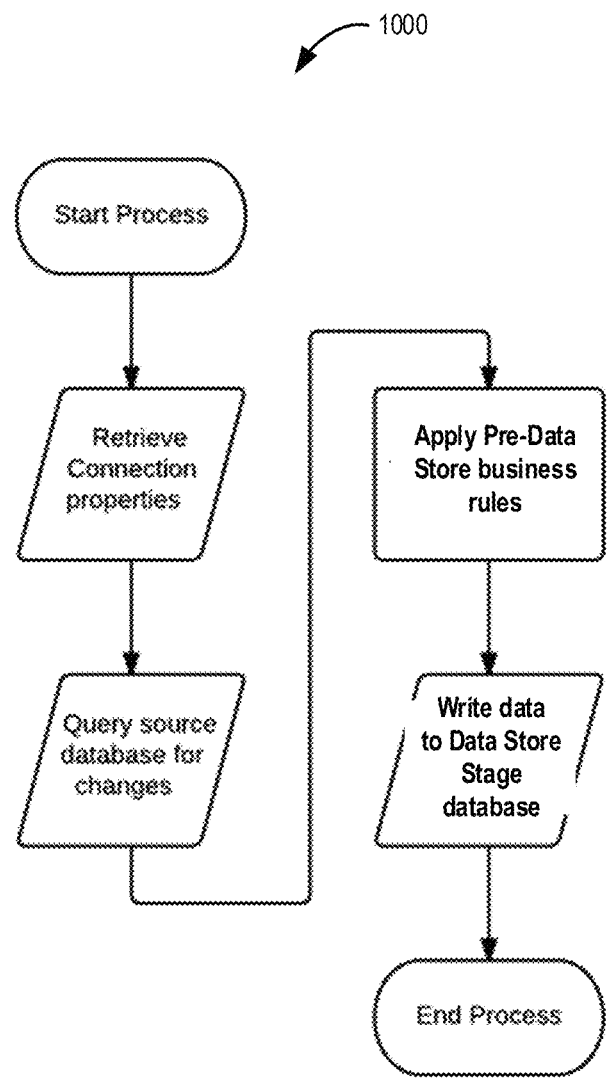

The data store stage has multiple processes associated with it. Some of these processes may rely on external systems to store the data. The purpose of the data store stage is to read data from the data store and pass it on to the integration stage to be sent to the target systems. There are two queuing processes: 1. trigger-based processes 900 (see FIG. 9), and 2. Polling-based processes 1000 (see FIG. 10).

Trigger-based queuing is more of a proactive approach. As changes are detected in the system, an event is triggered so additional processing can occur. The data store stage process is dependent on external systems when they are triggered based, therefore the development of the trigger, detecting the changes, and writing those changes to the data store are done outside of the integration framework herein.

The grey sections indicate the processes, which are external to the data store process. They are shown here to depict the life cycle of the data and how the data gets into the data store from which the data store manager retrieves.

With the trigger-data store process, an event occurs on the remote system detecting data that has changed and needs to be integrated. When the event occurs, the change is written to the data store stage table, which resides on the remote system. The data written includes, but is not limited to, the database name the change occurred in, the action to execute (insert, update, merge, delete), the reference value, which represents the key to retrieve the data when ready to integrate.

As indicated above, trigger-based queuing is more of a proactive approach. As changes are detected in the system, an event is triggered so additional processing can occur. The data store stage process is dependent on external systems when they are triggered based, therefore the development of the trigger, detecting the changes, and writing those changes to the data store are done outside of the integration framework.

The polling data store stage processes follow a different flow with the development and processing being done within the system and method herein described. In the trigger-based process changes were pushed to the data store. With polling the data is pulled from the source and placed on the data store. After retrieving the data connection properties, a query to the source is made to retrieve the data that has changed. In order to do this, some additional information needs to be tracked—when was the last time the process polled the source, and what records have changed since that time.

Once the changes have been collected, the pre-data store business rules are applied. This step is not performed with the trigger-based solution. Once the pre-data store business rules, if any, are processed the changes are put on the data store.

Figure 11:
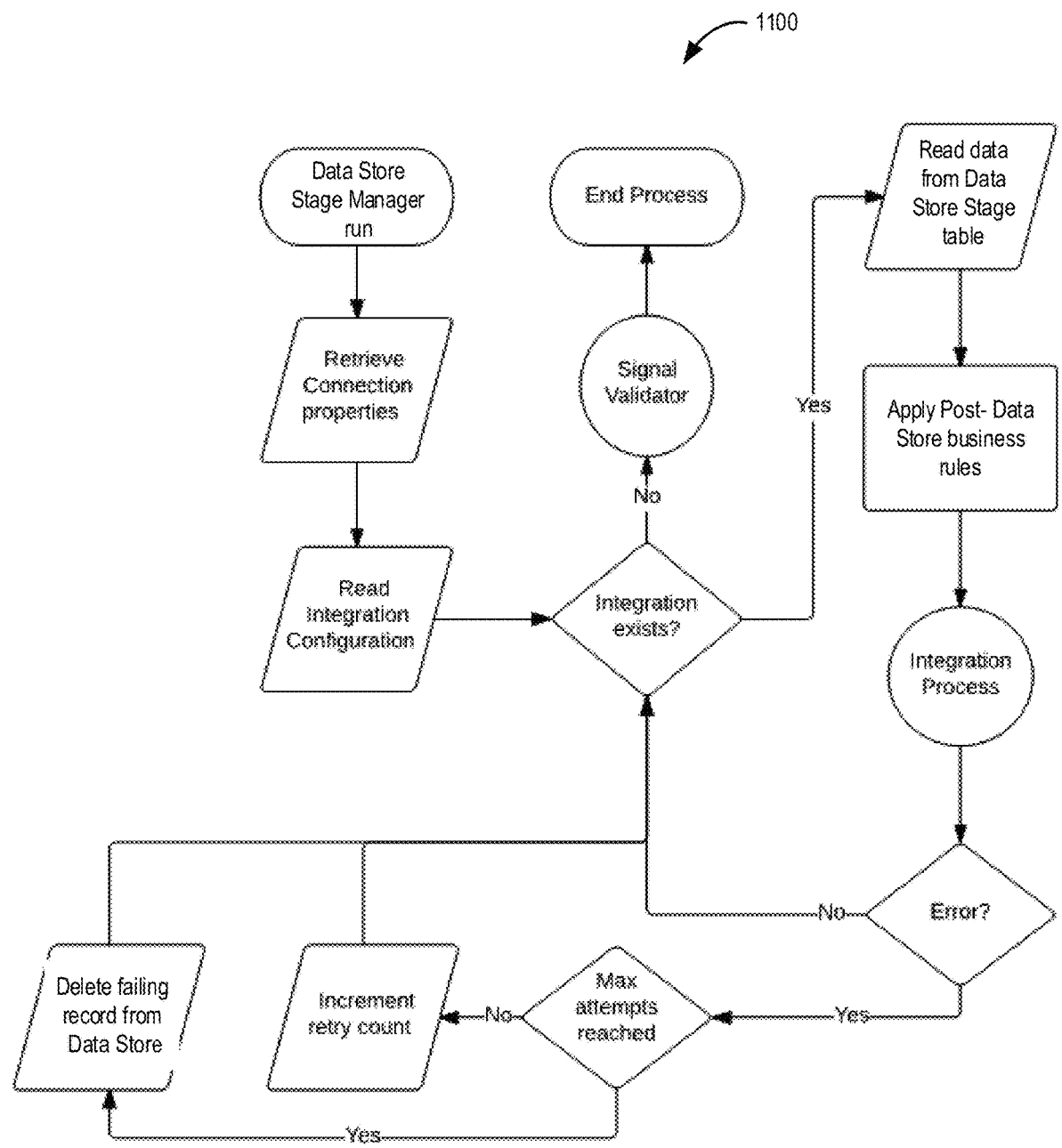

FIG. 11 illustrates a flowchart of processes 1100 implemented by the data store manager is configured to run at an interval specified by the user. When the data store stage manager runs, the connection properties of the source and target connections are read. The integration configurations define the integrations the data store manager is to support. For each integration, the data will be retrieved from the data store. Once the data is retrieved, the data store manager will apply any post-data store business rules that are configured. The data collected is then sent to the integration process. When the integration completes, the data store manager can the move onto the next integration. When integrations are processed, the data store manager will signal the validator stage 3 to run, if any integrations were created by the auto correct stage.

However, if the integration fails, the retry logic executes. In the properties the max number of retries is specified for each integration. If the retry count reaches the maximum number of retries specified, the record is deleted from the data store. After the number of retries is reached, there is no reason to continue. All activity is logged, and the errors will be in the validation reports with the cause of failure. If the maximum hasn't been reached, the retry count is incremented and will remain on the data store to be run again on the next cycle.

Exemplary Integration Flows

Figure 12:
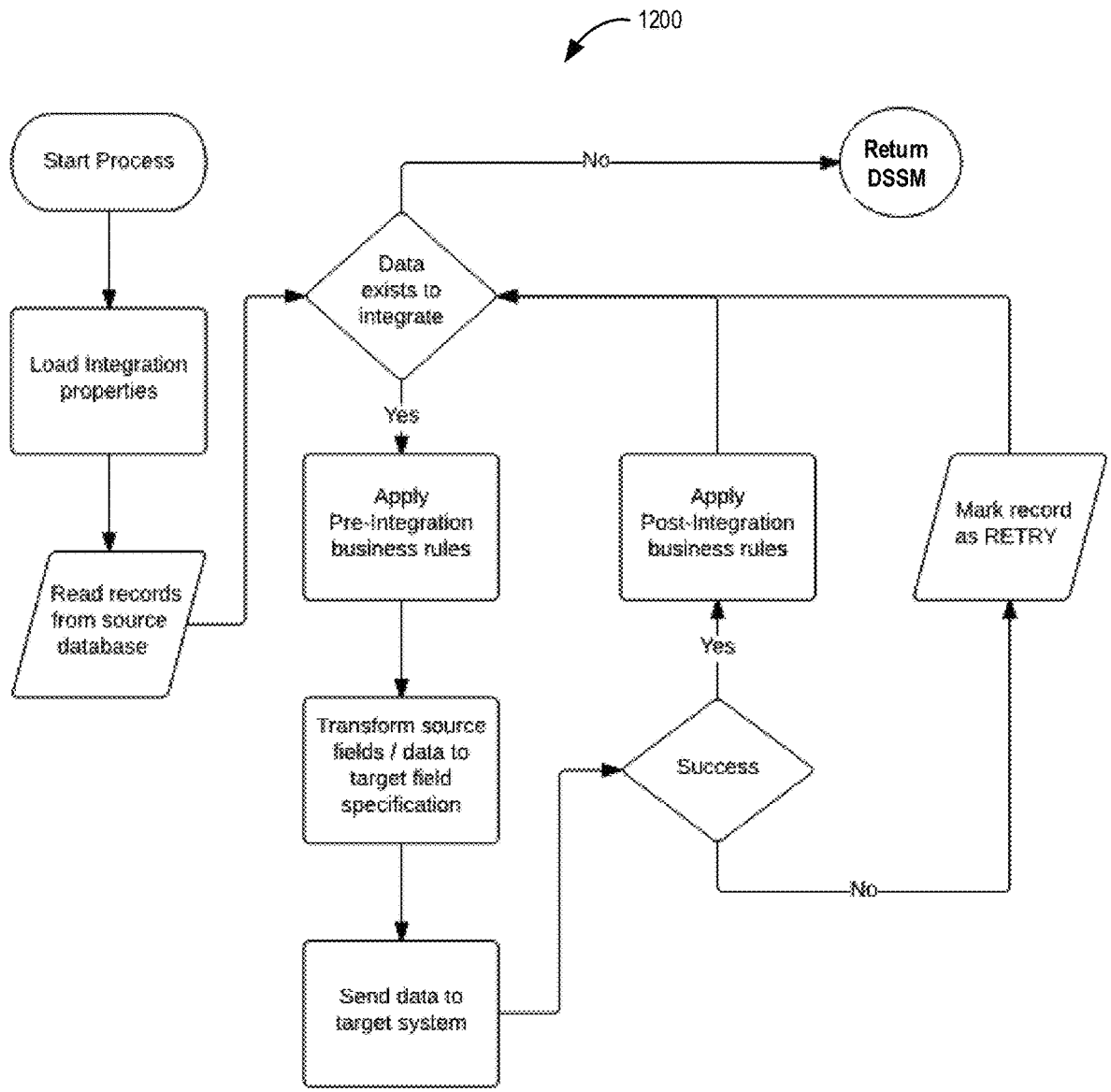

FIG. 12 illustrates processes 1200 implemented by an exemplary DSSM. The integration is called and managed be the DSSM. When the integration process starts the integration properties are loaded that describe the number of threads that should be spawned for the integration. The integration will create the request message to be sent to the target. This is done by taking the reference value that was passed to the data store, and retrieves the data to be integrated from the source using the reference value as the key. Once the data is retrieved, the pre-integration business rules will be applied. Any custom business rules are applied prior to the transformations. The transformations will use the mapping tables to transform the data from the source fields to the appropriate format the target is expecting. Once the request message is built, it is sent to the target.

If the message is successful, the post-integration business rules will be applied and the next batch of data will be processed. If there is no data to processes, the integration returns back to the DSSM. If the integration fails, the records are marked as retry to indicate to the DSSM that the record should be retried. The DSSM handles the retry processing.

Exemplary Data Store Stage Manager Integration State

Figure 13:
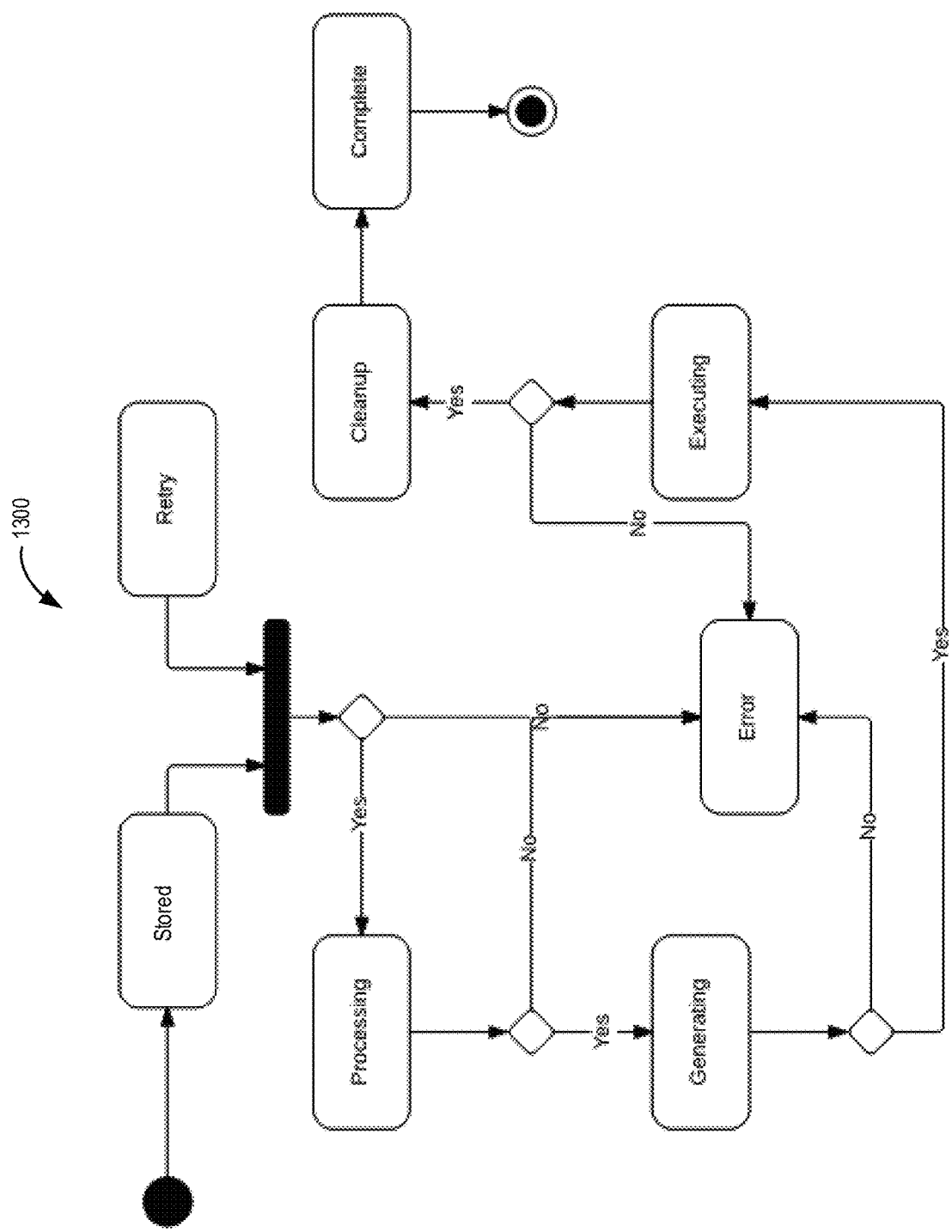

FIG. 13 illustrates example processes 1300 implemented by an exemplary DSSM. The DSSM manages the integration process. In order to maintain the processing events between the two stages, a state process was introduced to manage the processing duties between the data store and integration stages. The state process ensures the correct process is executed.

The state is initialized based on the data being retrieved from the data store, which can be either STORED or RETRY. At the end of each process of executions, the state determines if the next state of execution can be processed or if an error occurred. The processing state, represents the data being pulled off of the data store, the generating state represents the data being collected and generating the request for the integration. The executing state represents the integration execution. The cleanup is the analysis of the results and the logging of the results. The Complete state marks the integration completed, so there basically two result state in the process: Complete and Error. Each state is logged while the integration is being processed. If the log does not contain one of these two states, this will indicate a problem with the data store or integration configuration.

Exemplary Transformations

The transformations are configurable and are stored in the system database. The database schema for the transformation calculations spans several tables. However, the configuration for a transformation definition is stored in a table created at design time by the user. The configuration basically contains the data mapping information between the source and target fields. Additional metadata is stored to allow the ability to enable/disable integrations or validations at the field level.

| COLUMN NAME | DESCRIPTION |
| --- | --- |
| RULE | The rule to process for this field |
| SOURCE_FIELD_ID | The name of the field on the source system |
| SOURCE_FIELD | The password for the connection |

| COLUMN NAME | DESCRIPTION |
| --- | --- |
| SOURCE_DATATYPE | Data type for the field on the source system |
| TARGET_FIELD | The name of the field on the target system |
| TARGET_DATATYPE | Data type for the field on the target system |
| INTEGRATION_ACTIVE | Flag indicates to integrate this field |
| OPERATION | The operations that are allowed on the field represented as a bitmask for insert, update, merge, delete where 0 = none and 8192 = all. The bitmask represents each combination, which there are 13, resulting in a bitmask using 2n, 20 = 1, 213 = 8192 |
| VALIDATION_ACTIVE | Flag indicates to validate on this field |
| MISMATCH_ACTIVE | Flag indicates to process mismatches on the field if the validate active flag is true |

When populated, the table would contain the data as shown in the example below:

| RULE | SOURCE FIELD ID | SOURCE FIELD | SOURCE DATATYPE | TARGET FIELD | TARGET DATATYPE | INT ACTIVE | OPERATION | VALIDATE ACTIVE | MISMATCH ACTIVE |
| --- | --- | --- | --- | --- | --- | --- | --- | --- | --- |
| none | 1 | FIRST NAME | VARCHAR2 | FirstName | TEXT | Y | 8192 | Y | Y |
| none | 2 | LAST NAME | VARCHAR2 | LastName | TEXT | Y | 8192 | Y | Y |
| CONCAT | 3 | ADDRESS1 | VARCHAR2 | Street | TEXT | Y | 8192 | Y | Y |
| CONCAT | 4 | ADDRESS2 | VARCHAR2 | | | | | | |
| CONCAT | 5 | ADDRESS3 | VARCHAR2 | | | | | | |
| none | 6 | CITY | VARCHAR2 | City | TEXT | Y | 8192 | Y | Y |
| none | 7 | STATE | VARCHAR2 | State | TEXT | Y | 8192 | Y | Y |
| none | 8 | ZIP_CODE | VARCHAR2 | PostalCode | TEXT | Y | 8192 | Y | Y |

The rule field, which is optional, will point to the business rule that contains the relationship to the formulas to execute. The business rule formula contains pointers to the parameter mapping for a formula. The parameters can contain the values of a field represented by the mapping table, or can contain a static value.

In the example above, the street address in the source is specified in three separate fields: ADDRESS1, ADDRESS2, ADDRESS3. In the target, the street address is contained in one field: Street. In the target, a newline character '\n' should separate the address lines. When configuring the transformation, we select the CONCAT formula, which can take a variable number of parameters.

With the parameter ordering provided, we can specify the parameters and the order in which they should be passed to the formula. The first parameter is set to the source field identified by the source field id of 3. The second parameter is set to the static value representing a newline character. The remaining parameters are configured in the same manner.

| PARAMETERS | | |
| --- | --- | --- |
| ORDER | REFERENCE | STATIC |
| 1 | 3 | |
| 2 | | '\n' |
| 3 | 4 | |
| 4 | | '\n' |
| 5 | 5 | |

When the formula runs, the following is executed and the result is set for the target field as shown below.

CONCAT(P1, P2, P3, P4, P5)=>Street

CONCAT('123 Kahula Drive', '\n', 'Suite 202', '\n', 'Attn: Jane Doe')=>Street

| SOURCE DATA | TRANSFORM | TARGET DATA |
|---|---|---|
| John | ==> | John |
| Doe | ==> | Doe |
| 123 Kahula Drive | CONCAT('123 Kahula | 123 Kahlua Drive |
| Suite 202 | Drive', '\n', Suite 202, '\n', | Suite 202 |
| Attn: Jane Doe | Attn: Jane Doe') | Attn: Jane Doe |
| Minneapolis | ==> | Minneapolis |
| MN | ==> | MN |
| 55412 | ==> | 55412 |

Exemplary Validator Stage 1 and Validator Stage 2 Flows

Figure 14:
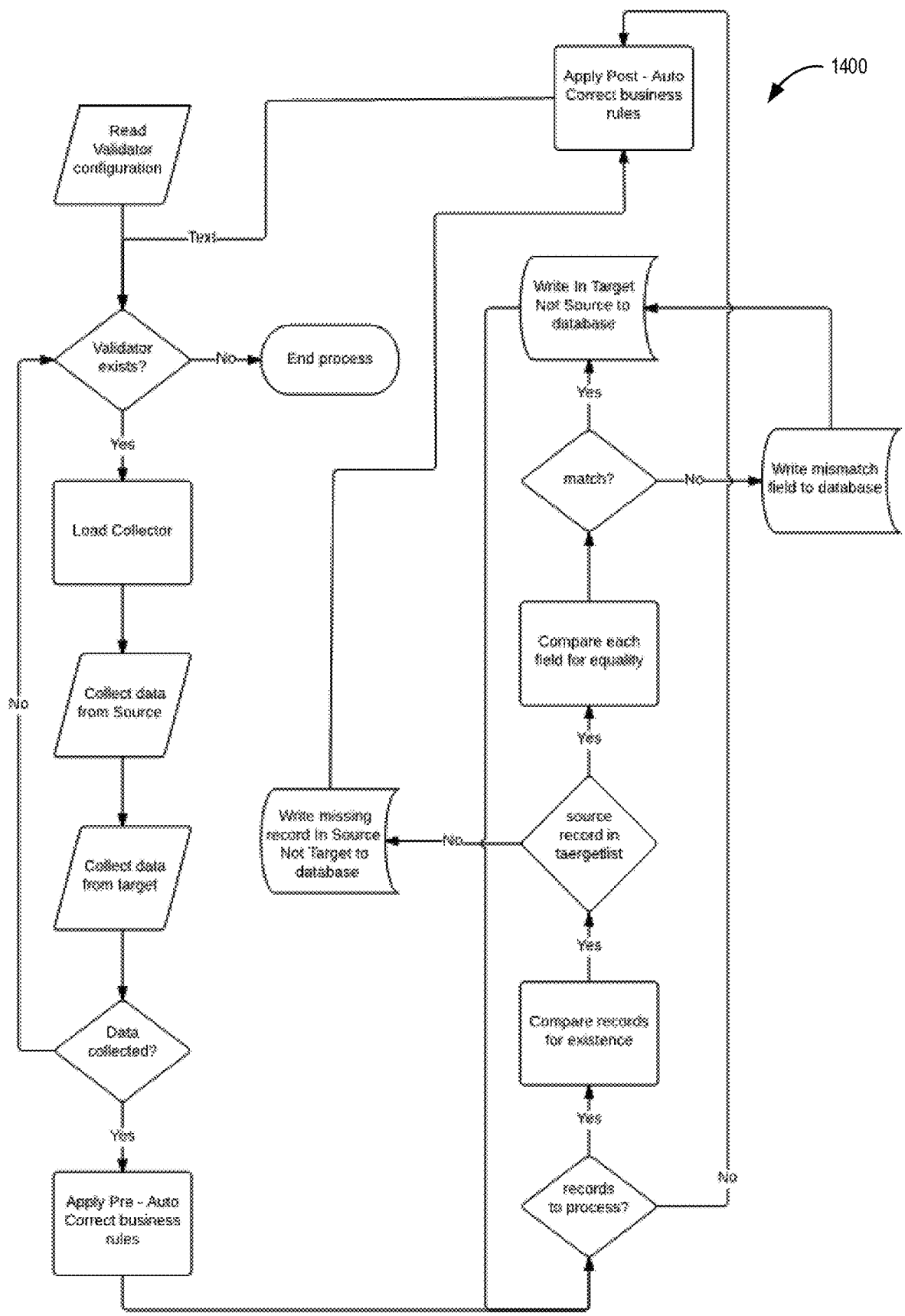

FIG. 14 illustrates a flowchart of example processes 1400 implemented by an exemplary validator. The validator can run in multiple stages. The difference between the stages resides in how the data is collected, or more importantly what data is collected. Regardless of the stage, the actual validation process is the same.

When the Post Validator Manager starts, the validation configuration data is loaded, which contains the validators and the support configuration data. For each validator, a collector, which is defined in the configuration, is instantiated. The collector will collect the source and target data to be compared. When the data is collected, the pre-validator business rules are applied.

The validator will check for records of existence. This entails checks for records that are in the source but are not in the target, and for records that are in the target but are not in the source. For those records that are missing from the source, they are written to the missing log.

For those records that are in existence in both systems, the comparison is done for each field of the record. If a transformation was defined for the integration, it must be executed for the validation as well in order for the comparison to match. But, if it is discovered that there is no possible way to match on a field, the field can be omitted from the validation. Any mismatched that are found are written to the mismatch log.

After the mismatch comparison, the target not in source records is written to the missing logs. The target not in source records, require a little more investigation as to which source the record came from, if a group of source connections were configured. The mapping to the correct source is defined in the configuration.

The last step of the validation process is to apply the post-validation business rules.

Exemplary Collectors

An important element to the validators handling mass amounts of data is the collectors. The more data to process requires more system resources such as CPU and memory. Processing data in smaller chunks allows memory to be freed allow the CPU to process the data in memory in place of swapping data to disk, or in the worst case, running out of memory.

The collectors are part of the framework therefore allowing new collectors to be developed by users. The collectors are defined with the validator configuration tables. Each collector is configurable with an interval parameter to specify the amount of data to collect. The system and method can include the following collectors:

The date time interval collector allows records to be collected on a date field, such as an order date. The interval can be set 1 to n number of months. The collector will retrieve data from the source and target systems based on the date. The number of records returned is based on the interval set in the configuration.

The alphabetical collector allows records to be collected based on a field such as a name, whether it being a person or place of business. The interval can be set 1 to n number of letter group. For example, if the interval is set to 3, the initial group collected would contain names that start with A, B, or C. The next interval would be D, E, and F. The number of records returned is based on the interval set in the configuration.

The location collector allows records to be collected based on a field containing a location. The interval can be set to city, state, postal code, or country. This collector will reference the location configuration defined by the user to determine the locations to use. The number of records returned is based on the interval set in the configuration and the location configuration.

The count collector allows the specific number of records to be collected. The interval can be set 1 to n number of records. The number of records returned will be equal to or less than the interval specified.

The revalidate is a special collector that is used by Validation Stage 2. The number of records returned are based on the number of records that need to be revalidated based on the results of validation Stage 1. Validation Stage 3 also uses this collector after the Auto Correct stage has run. This collector should only be utilized by integration framework.

The all collector is the default collector and should only be used on small data sets. Using the all collector on large data sets will ultimately fail. If the collection of data being validator has no field to key off, a custom collector should be developed. This collector does utilize the interval setting.

Exemplary Auto Correct

Figure 15:
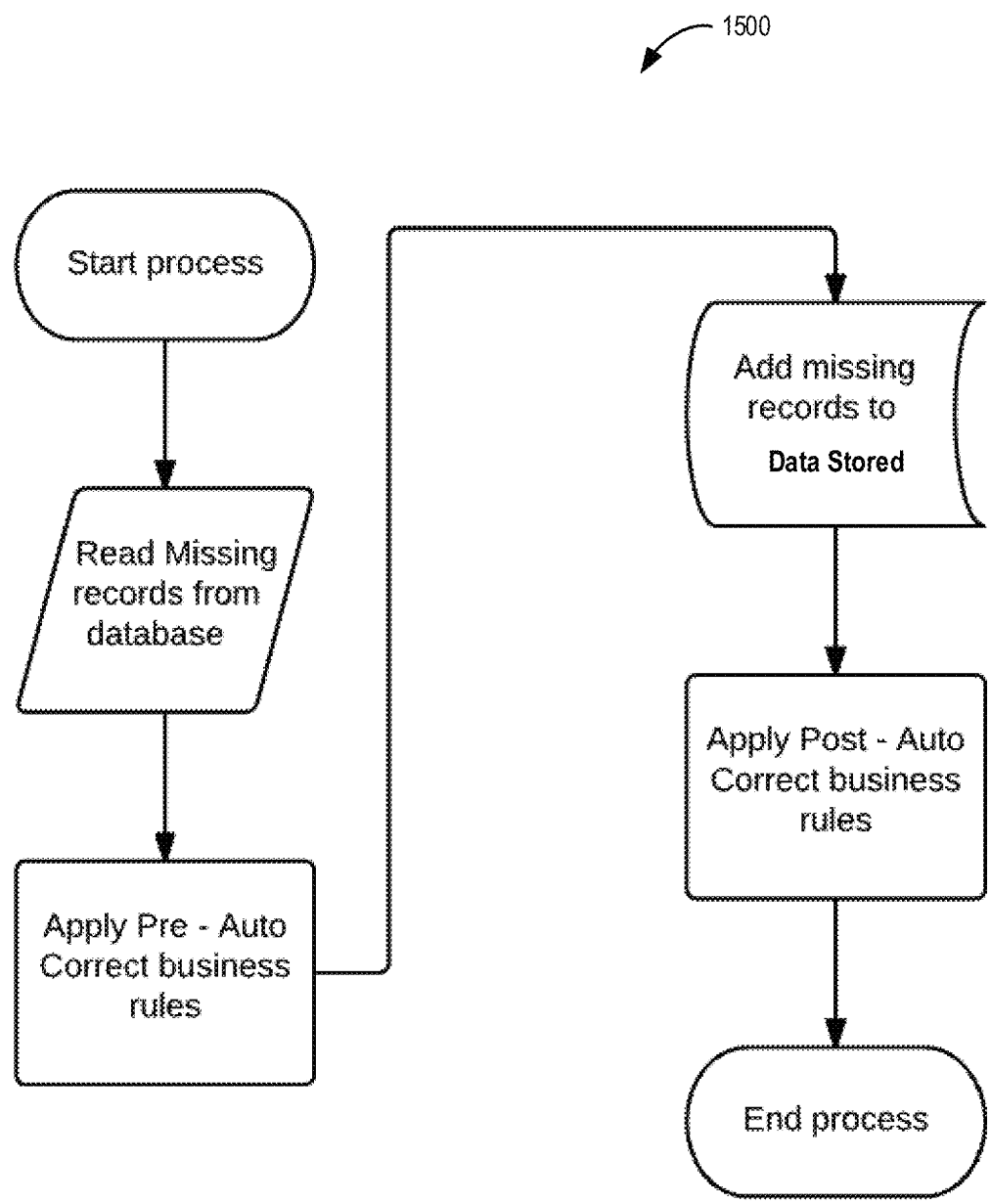

FIG. 15 illustrates a flow chart of example auto-correct processes 1500 implemented by an exemplary corrector. The auto correct process is relatively simple. Records that were reported as missing are placed back onto the data store to be re-integrated. If business rules are defined for the pre or post auto correct stages, they will be applied.

The complexity of the auto correct process is determining the fields to place onto the data store. As most of the fields are trivial, the database field may be complicated, especially when there is more than one connection for the source. In this case a business rule will need to be defined at the pre-auto correct stage.

Exemplary Validator Stage 3

Figure 16:
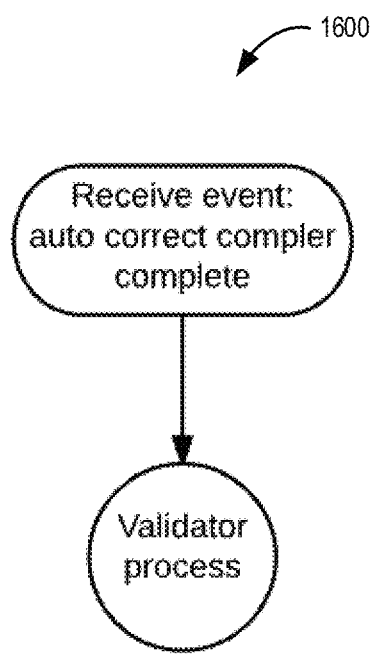

FIG. 16 illustrates examples processes 1600 of validation stage 3. The third stage of the validation is very similar to the validation stages 1 and 2. The primary difference is the manner in which it is called. While validation stages 1 and 2 run back-to-back, validation stage 3 is signaled after the integration completes from auto correct stage.

Figure 17:
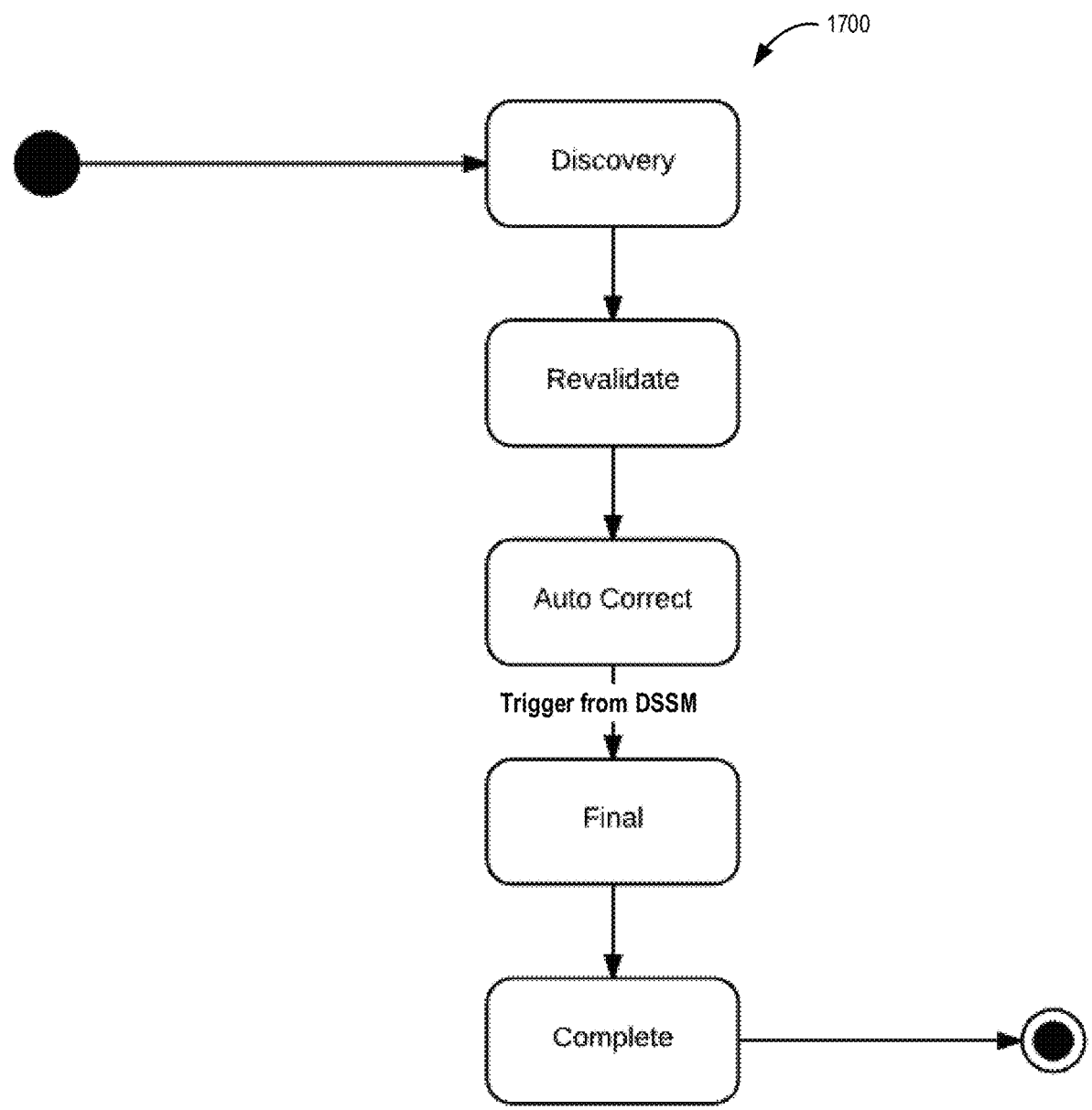

In place of sleeping for a fixed amount of time, the integration stage will signal the validation stage 3 to start, Exemplary Validation State FIG. 17 illustrates examples processes 1700 implemented via an example validator state. The validator state keeps track of which validation stage is currently being executed.

Each state gets logged to the validation logs to help determine what stage the validators are currently running.

The Validation Stage 1 stage is referred to the discovery stage since that is the purpose of the stage. Once the data is collected, the next state is processed and the Validation Stage 2 is executed. This stage is referred to as the revalidate state. After the revalidation is complete the next state transitions to auto correct. From that point, the validator sleeps until the complete event is sent from the DSSM managing the integrations. From that point, the state transitions to the final state: Validation Stage 3. After the final validation runs, the state is transitioned to complete.

Exemplary Reports

Figure 18:
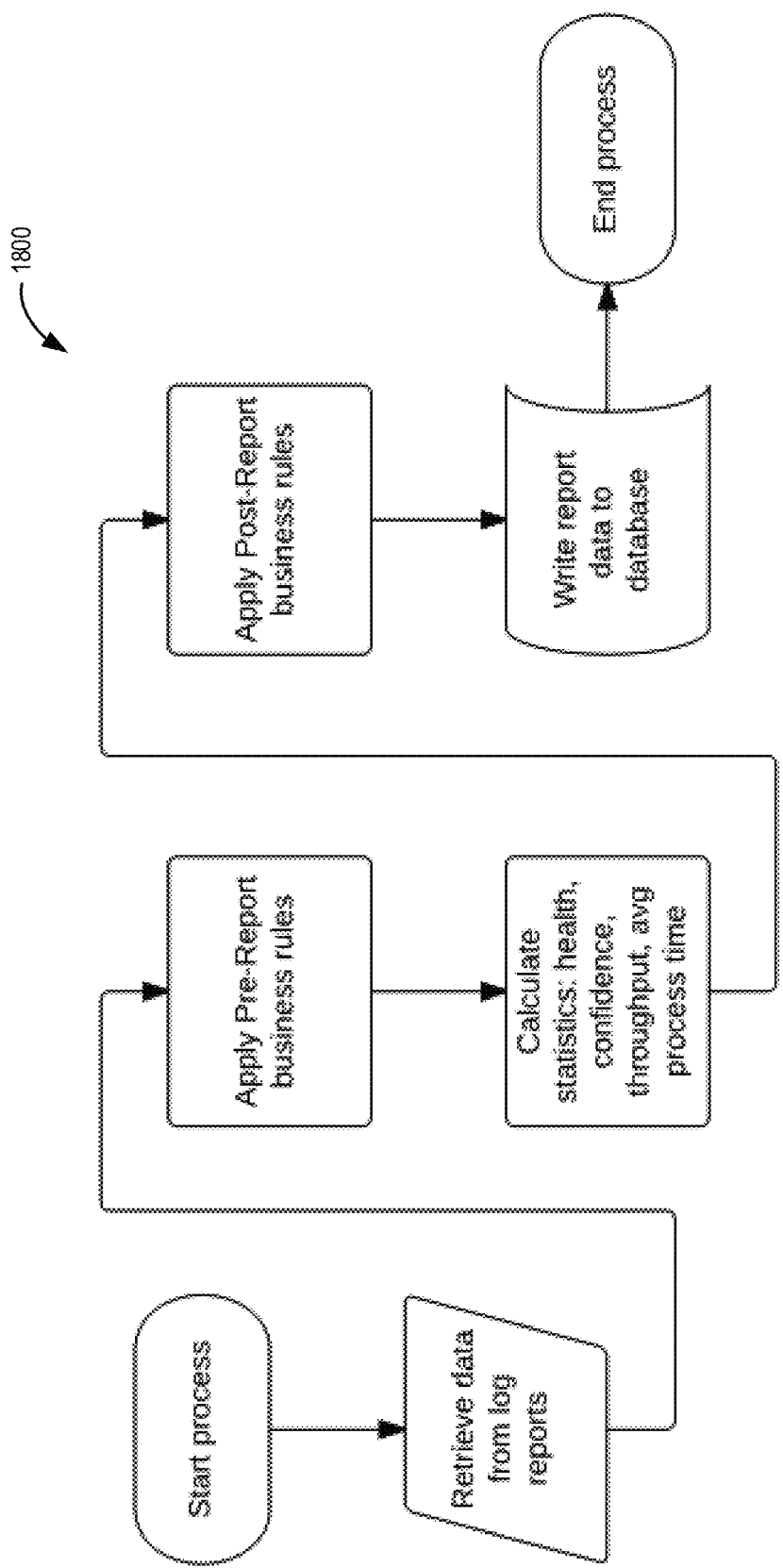

FIG. 18 illustrates a flowchart of examples processes 1800 of an exemplary reporting process. The report process is started after the validations complete. The purpose of the report is to take the results of the integrations and the validations to produce an analytic view. The report engine retrieves the data from the integration log, integration batch log, validation log, validation missing log, validation mismatch log, and validation duplicate log.

Any business rules that were configured for the pre-report stage will be applied. The user configures these rules. The report engine will calculate and generate the reports. These reports are as follows:

The health report calculates the health of the data between the source and target systems. The health is an overall score based on the success of the integrations. This is to help determine if the configurations are correct, the connections to the source and target systems are reliable, and that the number of attempts to integrate the data is minimal. The health report displays a red, yellow, green overview icon on a dashboard to give a quick indication of the status. The user sets the scores that define the range for the colors. Green: successful, in range, Yellow: warning below optimal, Red: error, needs immediate attention.

The confidence report highlights the overall data integrity between the source and target systems. The determination of whether a score is successful is based on how the user views the success. The user can define the percentage of how successful the integrations perform. The score/percentage is calculated based on the number of missing from source and target, the number of data that is mismatched between source and target, and the number of duplicates in the source and target systems. It is possible that duplicates and mismatches are excepted, so in this case the percentages can be lower as compared to records being missing which would typically be set to 100% accurate.

The throughput report demonstrates the amount of data that is being processed for each data store stage manager and each post validation manager. The indicators display in percentage the current throughput as it compares to the optimal, normal, and max throughput. The indicators help manage when a new data store stage manager or post validation manager should be added.

The Average Process Time report shows the time it takes to process the data in integration. The report lists the details, for each integration, covering the time it takes to integrate the data from the data store to the target system. This report helps set the amount of record to pull from the data store and the number of threads to configure for an integration.

Any business rules that were configured for the post-report stage will be applied. The user configures these rules.

After the post rules are applied, the data is written to the database to be available to the user.

Additional Exemplary Features

Systems and methods described herein provide a comprehensive tool that comprises of seven stages to integrate and validate data going between systems. Data validation is much overlooked, as it is not a task that can be manually by an individual or team of individuals. Some of the data is in non-readable format, which makes manual validation impossible.

But aside from the data, the system and method herein also validates business process change. When processes are modified by the way data is entered or stored, it is very possible that integrations can be impacted. Without the tools to monitor changes in the data over time, they are either not found and ignored, or difficult to find which impacts overall support of the integrations, and raises costs.

The manner in which the system and method herein manages the stages of an integration and multiple validations ensure the accuracy of the data, an accuracy of which could not be performed by a human manually. Humans would introduce more errors. Viewing the daily dashboard reports indicate the health and confidence of the integrations. This in turn, provides executes, managers, and users of the data to have high confidence in what they are presenting and/or using, which prior to the system and method herein was not always the case.

Figure 19:
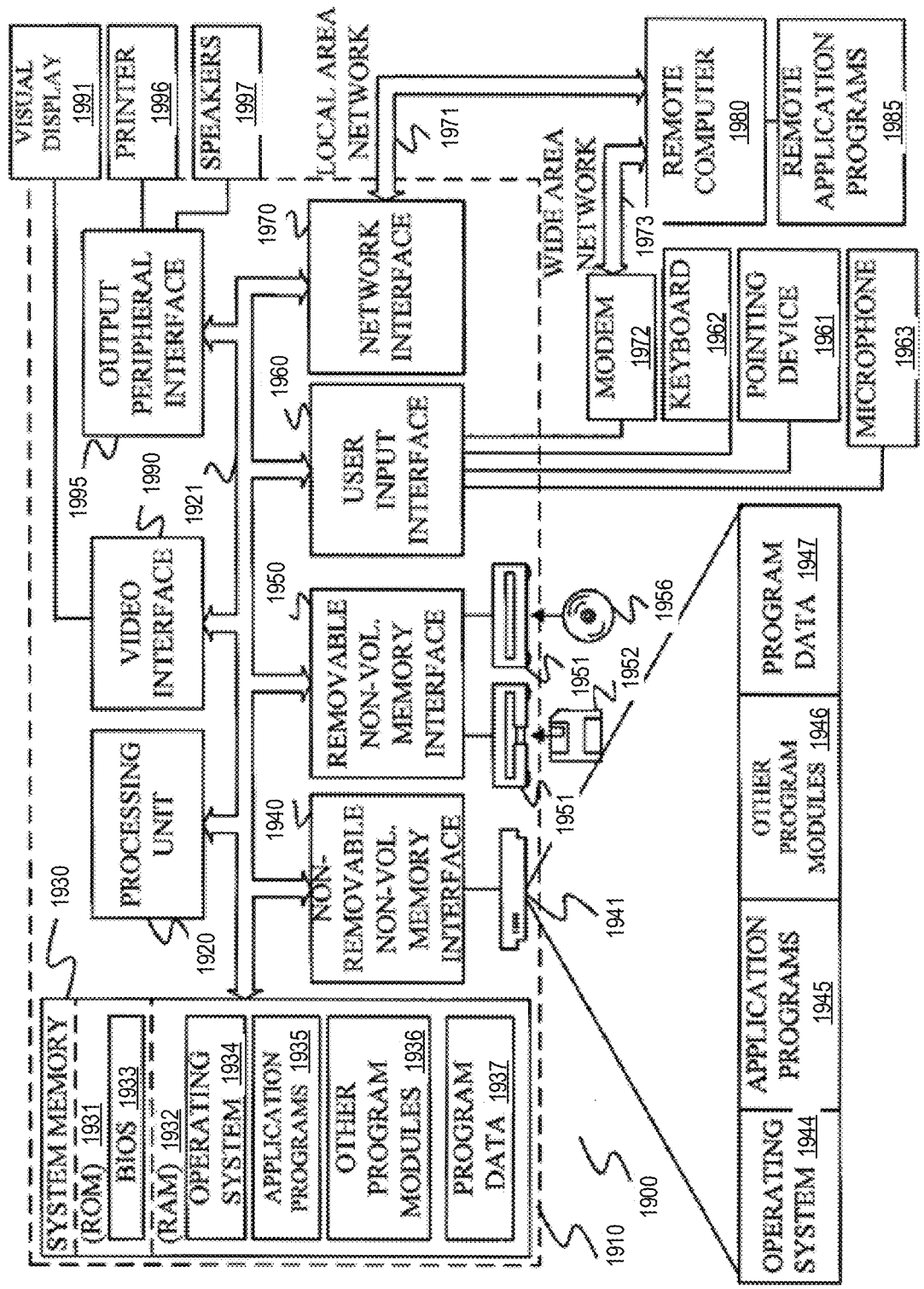
FIG. 19 illustrates a block diagram of an exemplary embodiment of a computing environment in which the systems and methods described herein can be deployed.

FIG. 19 illustrates an exemplary embodiment of a computing environment 1900 in which the systems and methods described herein can be deployed. The exemplary computing environment includes a general-purpose computing device in the form of a computer 1910. Components of computer 1910 may include, but are not limited to, a processing unit 1920 (which can comprise processor 106), a system memory 1930, and a system bus 1921 that couples various system components including the system memory to the processing unit 1920. The system bus 1921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Programs and data described above can be deployed in corresponding portions of the exemplary computing environment.

Computer 1910 typically includes a variety of computer readable media. Computer readable media can be any available media that can be accessed by computer 1910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1910. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1930 includes computer storage media in the form of volatile and/or nonvolatile memory such as read only memory (ROM) 1931 and random access memory (RAM) 1932. A basic input/output system 1933 (BIOS), containing the basic routines that help to transfer information between elements within computer 1910, such as during start-up, is typically stored in ROM 1931. RAM 1932 typically contains data and/or program modules that are immediately accessible to and/or presently being operated on by processing unit 1920. By way of example, and not limitation, the figure illustrates operating system 1934, application programs 1935, other program modules 1936, and program data 1937.

The computer 1910 may also include other removable/non-removable volatile/nonvolatile computer storage media. By way of example only, the figure illustrates a hard disk drive 1941 that reads from or writes to non-removable, nonvolatile magnetic media, a magnetic disk drive 1951 that reads from or writes to a removable, nonvolatile magnetic disk 1952, and an optical disk drive 1955 that reads from or writes to a removable, nonvolatile optical disk 1956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1941 is typically connected to the system bus 1921 through a non-removable memory interface such as interface 1940, and magnetic disk drive 1951 and optical disk drive 1955 are typically connected to the system bus 1921 by a removable memory interface, such as interface 1950. Those skilled in the art can provide computer readable instructions with data structures to implement that described and illustrated above.

The drives and their associated computer storage media discussed above and illustrated in the figure, provide storage of the computer readable instructions, data structures, program modules and other data for the computer 1910. For example, hard disk drive 1941 is illustrated as storing operating system 1944, application programs 1945, other program modules 1946, and program data 1947. Note that these components can either be the same as or different from operating system 1934, application programs 1935, other program modules 1936, and program data 1937. Operating system 1944, application programs 1945, other program modules 1946, and program data 1947 are given different numbers here to illustrate that, at a minimum, they are different copies.

A user may enter commands and information into the computer 1910 through input devices such as a keyboard 1962, a microphone 1963, and a pointing device 1961, such as a mouse, trackball or touch pad. Other input devices (not shown) may include a joystick, game pad, satellite dish, scanner, or the like. These and other input devices are often connected to the processing unit 1920 through a user input interface 1960 that is coupled to the system bus, but may be connected by other interface and bus structures, such as a parallel port, game port or a universal serial bus (USB). A visual display 1991 or other type of display device is also connected to the system bus 1921 via an interface, such as a video interface 1990. In addition to the monitor, computers may also include other peripheral output devices such as speakers 1997 and printer 1996, which may be connected through an output peripheral interface 1995.

The computer 1910 is operated in a networked environment using logical connections to one or more remote computers, such as a remote computer 1980. The remote computer 1980 may be a personal computer, a hand-held device, a server, a router, a network PC, a peer device or other common network node, and typically includes many or all of the elements described above relative to the computer 1910. The logical connections depicted include a local area network (LAN) 1971 and a wide area network (WAN) 1973, but may also include other networks. Such networking environments are commonplace in offices, enterprise-wide computer networks, intranets and the Internet.

When used in a LAN networking environment, the computer 1910 is connected to the LAN 1971 through a network interface or adapter 1970. When used in a WAN networking environment, the computer 1910 typically includes a modem 1972 or other means for establishing communications over the WAN 1973, such as the Internet. The modem 1972, which may be internal or external, may be connected to the system bus 1921 via the user input interface 1960, or other appropriate mechanism. In a networked environment, program modules depicted relative to the computer 1910, or portions thereof, may be stored in the remote memory storage device. By way of example, and not limitation, the figure illustrates remote application programs 1985 as residing on remote computer 1980. It will be appreciated that the network connections shown are exemplary and other means of establishing a communications link between the computers may be used.

What is claimed is:

1. A computer-implemented method, comprising:
   storing a plurality of identifiers in a first data store, each of the plurality of identifiers associated with a respective object, the respective objects being readable objects of a data source;
   storing metadata associated with a plurality of integration actions in the first data store or in a second data store linked to the first data store, each of the plurality of integration actions being associated with one of the objects;
   performing, during a first time period, the plurality of integration actions according to an integration request, the performing of the plurality of integration actions including at least one of creating objects, updating objects, and removing objects in a data target according to the corresponding objects of the data source;
   performing, during a second time period, a discovery stage validation on readable objects of the data source and the data target to discover errors or uncertainties associated with the readable objects of the data source and the data target, the second time period being independent of the first time period; and
   performing, during a third time period, a re-validation on the readable objects that are associated with errors or uncertainties discovered in the discovery stage validation, the third time period being independent of the first time period.

2. The method of claim 1, wherein the second time period occurs during the first time period.

3. The method of claim 1, wherein the third time period occurs subsequent to the second time period and during the first time period.

4. The method of claim 1, wherein each the plurality of integration actions is stateful, and statefulness of each of the integration actions is maintained by at least one of the stored plurality of identifiers and the stored metadata.

5. The method of claim 4, further comprising tracking states of at least one of the objects and the integration actions, and the states include whether a respective object or a respective integration action has an error or an uncertainty.

6. The method of claim 1, wherein the storage of the plurality of identifiers or the metadata results from triggers in the data source or the data target.

7. The method of claim 1, further comprising polling at least one of the data source or the data target, and wherein the storage of at least one of the plurality of identifiers and the metadata results from the polling.

8. The method of claim 1, wherein storage of the plurality of identifiers or the metadata results from the discovery stage validation.

9. The method of claim 1, wherein the performance of the discovery stage validation during the second time period is periodic and schedulable.

10. The method of claim 1, further comprising delaying the storing of the plurality of identifiers and the metadata and the performing of the plurality of integration actions for a selected period of time or until the respective objects are created, and wherein the delaying is configurable and/or automated according to historical frequencies and/or durations of creations of objects.

11. The method of claim 1, wherein the discovery stage validation includes:
scanning the data target and the data source of the objects for errors or uncertainties associated with the objects;
identifying the objects with errors or uncertainties; and
if not already stored in the first data store or the second data store, storing at least one of identifiers and corresponding metadata in the data store associated with the identified objects with errors or uncertainties.

12. The method of claim 11, wherein the re-validation includes scanning the data target and the data source of the objects to discover errors or uncertainties associated with the objects, and wherein the scanning during the re-validation is specific to data specifically associated with the errors or uncertainties identified during the discovery stage validation.

13. The method of claim 12, further comprising, when errors or uncertainties associated with the objects are discovered during the re-validation, performing, during a fourth time period subsequent to the third time period, an auto-correction on data with the errors or uncertainties discovered in the re-validation, the fourth time period being independent of the first time period.

14. The method of claim 13, further comprising, via the auto-correction, populating at least one of the first data store or the second data store with identifiers and corresponding metadata for a subsequent integration.

15. The method of claim 13, further comprising performing, during a fifth time period, a post auto-correction validation on the auto-corrected data subsequent to the fourth time period, the fifth time period being independent of the first time period.

16. The method of claim 1, wherein at least one of the operations recited in claim 1 runs on multiple threads, and wherein the threads are processed simultaneously by a set of data processing devices that operate in parallel.

17. The method of claim 1, wherein at least one of the first data store and the second data store includes a data structure that includes at least one of a database table, an associative array, a graph, and an XML document.

18. The method of claim 1, wherein the first data store includes a queue, and wherein the storing of the plurality of identifiers occurs in the queue.

19. The method of claim 18, wherein storing at least part of the metadata occurs in the queue.

20. The method of claim 1, wherein:
at least one first computer implements the storing recited in claim 1,
at least one second computer implements the performance of the integration actions,
at least one third computer implements at least one of the performance of the discovery stage validation and the performance of the re-validation,
at least one fourth computer implements the data source,
at least one fifth computer implements the data target,
at least one sixth computer implements at least the first data store, and
the first, second, third, fourth, fifth, and sixth computers are each powered separately with separate power sources and communicate with each other over a computer network.

21. A computer-implemented method, comprising:
storing a plurality of identifiers in a first data store, each of the plurality of identifiers associated with a respective object, the respective objects being readable objects of a data source;
storing metadata associated with a plurality of integration actions in the first data store or in a second data store linked to the first data store, each of the plurality of integration actions being associated with one of the objects;
performing, during a first time period, the plurality of integration actions according to an integration request, the performing of the plurality of integration actions including at least one of creating objects, updating objects, and removing objects in a data target according to the corresponding objects of the data source;
performing, during a second time period, a discovery stage validation on readable objects of the data source and the data target to discover errors or uncertainties associated with the readable objects of the data source and the data target, the second time period being independent of the first time period;
performing, during a third time period, a re-validation on the readable objects that are associated with errors or uncertainties discovered in the discovery stage validation, the third time period being independent of the first time period; and
when errors or uncertainties associated with the objects are discovered during the re-validation, performing, during a fourth time period subsequent to the third time period, an auto-correction on data with the errors or uncertainties discovered in the re-validation, the fourth time period being independent of the first time period.

* * * * *